United States Patent
Hamabe et al.

(12)
(10) Patent No.: US 6,569,968 B1
(45) Date of Patent: May 27, 2003

(54) POLYMER OF A WATER-SOLUBLE RADICAL-POLYMERIZABLE MONOMER, PROCESS FOR PRODUCING THE POLYMER AND FLOCCULANT COMPRISING THE POLYMER

(75) Inventors: Hidenori Hamabe, Atsugi (JP); Katsutoshi Kubo, Atsugi (JP); Tomoe Ueno, Ebina (JP)

(73) Assignee: Kurita Water Industries Ltd., Tokyo (JP)

( * ) Notice: Subject to any disclaimer, the term of this patent is extended or adjusted under 35 U.S.C. 154(b) by 128 days.

(21) Appl. No.: 09/632,397

(22) Filed: Aug. 4, 2000

(30) Foreign Application Priority Data

| Aug. 19, 1999 | (JP) | 11-233272 |
| Nov. 1, 1999 | (JP) | 11-311527 |
| Nov. 16, 1999 | (JP) | 11-325453 |
| Mar. 27, 2000 | (JP) | 2000-086515 |
| May 10, 2000 | (JP) | 2000-136787 |

(51) Int. Cl.[7] .................. C08J 4/04; C08J 2/06
(52) U.S. Cl. ............... 526/219.2; 526/237; 526/295; 526/219.3
(58) Field of Search .............. 526/294, 303.1, 526/220, 219.2, 219.3, 237, 295

(56) References Cited

U.S. PATENT DOCUMENTS

| 4,713,431 A | * | 12/1987 | Bhattacharyya et al. .... 526/207 |
| 4,851,429 A | * | 7/1989 | Peglion et al. .............. 514/444 |
| 5,248,744 A | * | 9/1993 | Cramm et al. ............ 526/219.3 |
| 5,412,047 A | * | 5/1995 | Georges et al. ............ 526/204 |
| 5,422,408 A | * | 6/1995 | Cramm et al. ............ 526/219.2 |
| 5,556,922 A | * | 9/1996 | Mueller et al. ............. 525/260 |
| 6,323,306 B1 | * | 11/2001 | Song et al. .................. 524/548 |

FOREIGN PATENT DOCUMENTS

WO 98/13346 4/1998

* cited by examiner

Primary Examiner—Tatyana Zalukaeva
(74) Attorney, Agent, or Firm—Frishauf, Holtz, Goodman & Chick, P.C.

(57) ABSTRACT

A process for producing a polymer of a diallylalkylammonium halide which comprises polymerizing the diallylalkylammonium halide in the presence of a polymerization initiator in an aqueous solution containing a nitroxy radical.

11 Claims, 3 Drawing Sheets

POLYMER OF A WATER-SOLUBLE RADICAL-POLYMERIZABLE MONOMER, PROCESS FOR PRODUCING THE POLYMER AND FLOCCULANT COMPRISING THE POLYMER

BACKGROUND OF THE INVENTION

1. Field of the Invention

The present invention relates to a polymer of a water-soluble radical-polymerizable monomer, a process producing the polymer and a flocculant comprising the polymer. More particularly, the present invention relates to a polymer of a radical-polymerizable monomer which has a narrow molecular weight distribution, has nitroxy group at the end of the molecule and is useful as a flocculant in the dewatering treatment of organic sludge, a process for producing the polymer in accordance with the living radical polymerization and a flocculant comprising the polymer.

2. Description of Related Art

In recent years, organic sludge containing biologically treated sludge which is formed from city waste water or by the sewage treatment has problems in that the amount of dewatering agents necessary for dewatering is increasing due to the increase in the amounts of organic substances and putrefaction and that the amount of the sludge treatment cannot be increased due to the increased content of water in the dewatered cake of sludge and dewatering sludge becomes more difficult. To dewater sludge which is not easily dewatered, various processes have been attempted and it is known that addition of organic macromolecular flocculants is effective.

For example, in Japanese Patent Application Laid-Open No. Showa 63(1988)-158200, as a process for dewatering sludge which can decrease the content of water in the dewatered cake and facilitates separation of the dewatered cake from a filter cloth, it is proposed that an inorganic flocculant is added to organic sludge, then an amphoteric organic macromolecular flocculant is added to the organic sludge which has a pH of 5 to 8 and the resultant sludge is dewatered. In Japanese Patent Application Publication Heisei 6(1994)-239, as a process for dewatering organic sludge which has a great capacity of the sludge treatment, shows a high recovery of suspended solids, facilitates separation of dewatered cake from a filter cloth and can decrease the content of water in the dewatered cake, it is proposed that an inorganic flocculant is added to the organic sludge, then an amphoteric macromolecular flocculant having a specific colloid equivalent value and a specific ratio of the amount of the anion to the amount of the cation is added to the organic sludge and the resultant organic sludge is dewatered. However, these processes have drawbacks in that a great amount of chemicals must be used and cost of the treatment increases, that the type of sludge to which the process is advantageously applied is limited and that apparatuses and operations are complicated.

Therefore, a flocculant which can be applied widely to organic sludge containing biologically treated sludge which is formed from city waste water and industrial waste water and by the sewage treatment, achieves effective dewatering by addition in a small amount, forms flocks having great strength and provides cake having a small water content, has been desired.

SUMMARY OF THE INVENTION

The present invention has an object to provide a polymer of a water-soluble radical-polymerizable monomer which has a narrow molecular weight distribution, has nitroxy group at the end of the molecule and useful as the flocculant in the dewatering treatment of organic sludge; a process for producing the polymer by the living radical polymerization; and a flocculant comprising the polymer.

As the result of extensive studies by the present inventors to overcome the above problems, it was found that a polymer of a water-soluble radical-polymerizable monomer having a narrow molecular weight distribution exhibits excellent properties as the organic macromolecular flocculant and that such a polymer can be produced by the living radical polymerization of a water-soluble radical-polymerizable monomer in an aqueous solution in the presence of a nitroxy radical. The present invention has been completed based on the above knowledge.

The present invention provides:

(1) A polymer of a water-soluble radical-polymerizable monomer which has nitroxy group at an end of a molecule;

(2) A process for producing a polymer of a water-soluble radical-polymerizable monomer which comprises polymerizing the water-soluble radical-polymerizable monomer in a presence of a polymerization initiator in an aqueous solution containing a nitroxy radical;

(3) A process described in (2), wherein the nitroxy radical is di-t-butylamineoxy radical, 2,2,6,6-tetramethyl-1-piperidinyloxy radical or 4-hydroxy-2,2,6,6-tetramethyl-1-piperidinyloxy radical;

(4) A process described in (2), wherein the nitroxy radical is insoluble in water and dispersed in an aqueous solution by dissolving the nitroxy radical into an organic solvent, followed by adding an obtained solution to the aqueous solution;

(5) A process described in (2), wherein the water-soluble radical-polymerizable monomer is a vinyl monomer soluble in water;

(6) A process described in (2), wherein the water-soluble radical-polymerizable monomer is a diallyldialkylammonium halide;

(7) A process described in (2), wherein the polymerization initiator is a redox polymerization initiator;

(8) A process described in (2), wherein the polymerization initiator is a salt of peroxodisulfuric acid;

(9) A process described in (2), wherein the nitroxy radical is present in an amount of 0.01 to 2 moles per 1 mole of the polymerization initiator;

(10) A process described in (2), wherein a polymerization temperature is 10 to 60° C.; and

(11) A flocculant which comprises a polymer of a water-soluble radical-polymerizable monomer produced in accordance with the process described in (2).

DESCRIPTION OF THE PREFERRED EMBODIMENTS

Figure 1:
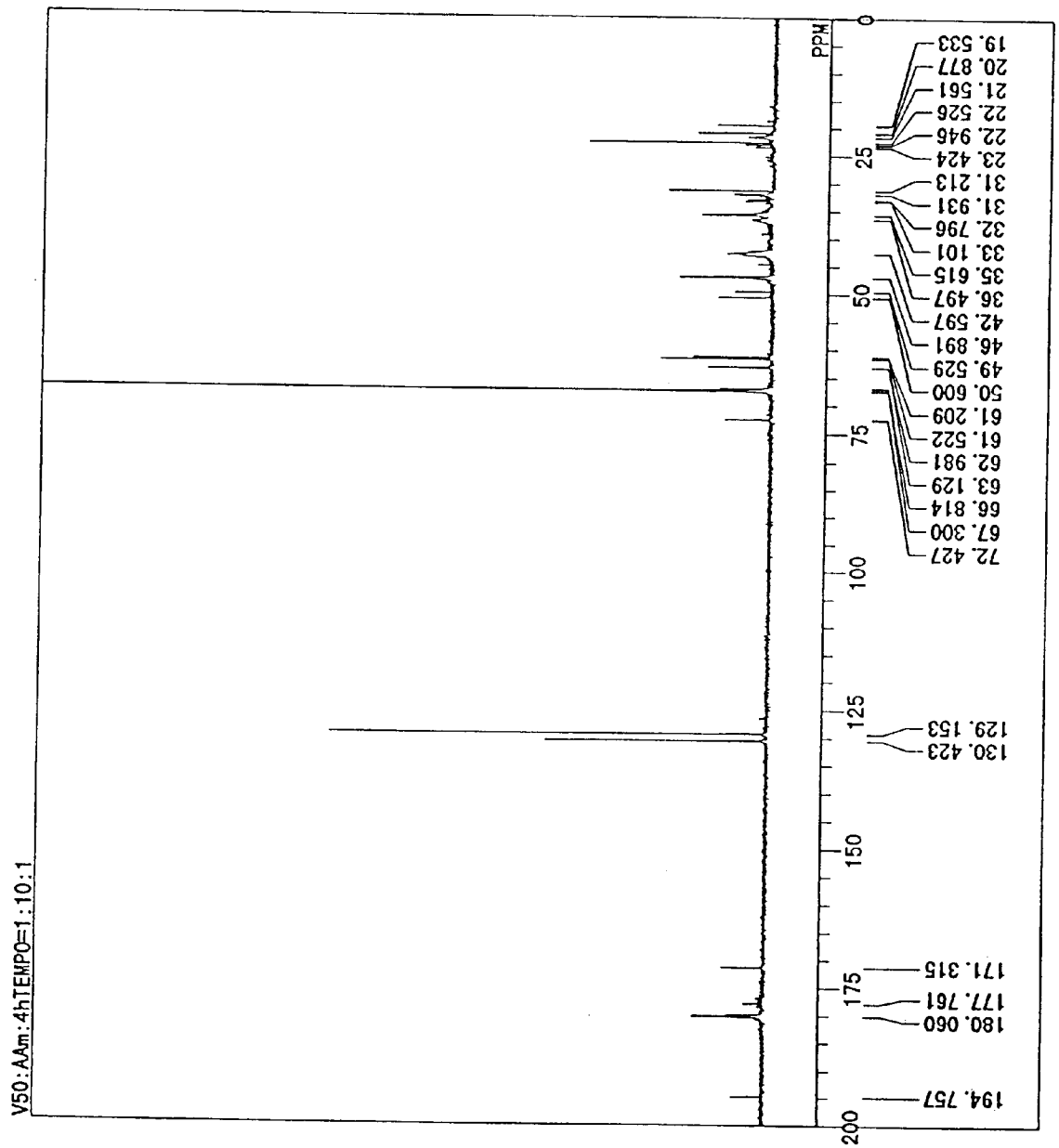
FIG. 1 shows a $^{13}$C-NMR spectrum of polymer B.

In the process for producing a polymer of a water-soluble radical-polymerizable monomer of the present invention, the water-soluble radical-polymerizable monomer is polymerized in the presence of a polymerization initiator in an aqueous solution containing a nitroxy radical. The polymer of a water-soluble radical-polymerizable monomer which is produced in accordance with the process of the present invention has a narrow molecular weight distribution and does not contain low molecular weight polymers. The flocculant of the present invention comprises the above polymer and has an excellent flocculating ability.

Examples of the nitroxy radical used in the present invention include di-t-butylamineoxy radical expressed by formula [1], 2,2,5,5-tetramethyl-1-pyrrolidinyloxy radicals represented by general formula [2], 2,2,6,6-tetramethyl-1-piperidinyloxy radicals represented by general formula [3] and 2,2,7,7-tetramethyl-1-perhydroazepinyloxy radicals represented by general Formula [4]. Formula [1] and general formulae [2] to [4] are as follows:

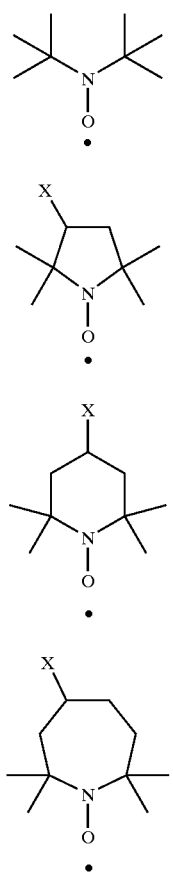

In general formulae [2] to [4], X represents hydrogen, hydroxyl group, amino group or carboxyl group.

Examples of the 2,2,5,5-tetramethyl-1-pyrrolidinyloxy radical represented by general formula [2] include 2,2,5,5-tetramethyl-1-pyrrolidinyloxy radical, 3-hydroxy-2,2,5,5-tetramethyl-1-pyrrolidinyloxy radical, 3-amino-2,2,5,5-tetramethyl-1-pyrrolidinyloxy radical and 3-carboxy-2,2,5,5-tetramethyl-1-pyrrolidinyloxy radical. Examples of the 2,2,6,6-tetramethyl-1-piperidinyloxy radical represented by general formula [3] include 2,2,6,6-tetramethyl-1-piperidinyloxy radical, 4-hydroxy-2,2,6,6-tetramethyl-1-piperidinyloxy radical, 4-amino-2,2,6,6-tetramethyl-1-piperidinyloxy radical and 4-carboxy-2,2,6,6-tetramethyl-1-piperidinyloxy radical. Examples of the 2,2,7,7-tetramethyl-1-perhydroazepinyloxy radical represented by general formula [4] include 2,2,7,7-tetramethyl-1-perhydroazepinyloxy radical, 4-hydroxy-2,2,7,7-tetramethyl-1-perhydroazepinyloxy radical, 4-amino-2,2,7,7-tetramethyl-1-perhydroazepinyloxy radical and 4-carboxy-2,2,7,7-tetramethyl-1-perhydroazepinyloxy radical. The compound expressed by formula [1] and the compounds represented by general formulae [2] to [4] may be used singly or in combination of two or more. Among these compounds, di-t-butylamineoxy radical, 2,2,6,6-tetramethyl-1-piperidinyloxy radical and 4-hydroxy-2,2,6,6-tetramethyl-1-piperidinyloxy radical are preferable.

In the process of the present invention, when the nitroxy radical expressed by formula [1] or represented by any of general formulae [2] to [4] is insoluble in water, it is preferable that the water-insoluble nitroxy radical is dispersed in water. The process for dispersing the water-insoluble nitroxy radical in water is not particularly limited. For example, the water-insoluble nitroxy radical may be dissolved in an organic solvent, the obtained solution may be added to an aqueous solution in which the water-soluble radical-polymerizable monomer is polymerized and the water-insoluble nitroxy radical may be dispersed in the aqueous solution. Alternatively, the water-insoluble nitroxy radical may be dispersed in water as fine particles using a ball mill or the like and the obtained aqueous dispersion of the water-insoluble nitroxy radical may be used as the medium for polymerization of the water-soluble radical-polymerizable monomer. Between these processes, it is preferable that the water-insoluble nitroxy radical is dissolved in an organic solvent and the obtained solution is added to an aqueous solution to obtain a dispersion of the nitroxy radical in the aqueous solution. The organic solvent used for dissolving the water-insoluble nitroxy radical is not particularly limited. It is preferable that the organic solvent is a hydrophilic organic solvent such as methanol, ethanol and acetone.

The water-soluble radical-polymerizable monomer which is polymerized in accordance with the process of the present invention is not particularly limited. Examples of the monomer include water-soluble vinyl monomers and diallyldialkylammonium halides. In the present invention, the water-soluble vinyl monomer include water-soluble monomers having vinyl group and water-soluble monomers having isopropenyl group.

The water-soluble vinyl monomer which is polymerized in accordance with the process of the present invention is not particularly limited. Examples of the water-soluble vinyl monomer include cationic vinyl monomers, nonionic vinyl monomers and anionic vinyl monomers. Examples of the water-soluble cationic vinyl monomer include monomers having quaternary ammonium group which are represented by general formula [5]:

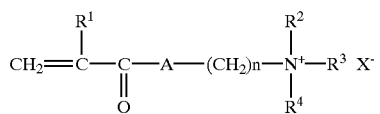

[5]

In general formula [5], $R^1$ represents hydrogen atom or methyl group, $R^2$ represents hydroxyl group or methyl group, $R^3$ represents methyl group or benzyl group, $R^4$ represents methyl group, A represents oxygen atom or imino group, X represents chlorine atom, bromine atom or $(SO_4)_{1/2}$ and n represents a number of 1 to 3.

Examples of the monomer represented by general formula [5] include sulfuric acid salts of dimethylaminomethyl (meth)acrylate, quaternary salts of methyl chloride with dimethylaminoethyl (meth)acrylate, quaternary salts of methyl bromide with dimethylaminoethyl (meth)acrylate, quaternary salts of benzyl chloride with dimethylaminoethyl (meth)acrylate, sulfuric acid salts of dimethylaminoethyl (meth)acrylate, hydrochloric acid salts of dimethylaminoethyl (meth)acrylate, (meth)acryloylaminoethyltrimethylammonium chloride and (meth)acryloylaminopropyltrimethylammonium chloride.

Examples of the water-soluble nonionic vinyl monomer which is polymerized in accordance with the process of the present invention include (meth)acrylamides represented by general formula [6]:

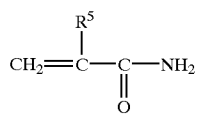

[6]

In general formula [6], $R^5$ represents hydrogen atom or methyl group.

Examples of the water-soluble anionic vinyl monomer which is polymerized in accordance with the process of the present invention include polymerizable unsaturated carboxylic acids represented by general formula [7]:

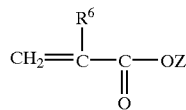

[7]

In general formula [7], $R^6$ represents hydrogen atom, methyl group or carboxymethyl group and Z represents hydrogen atom or sodium atom.

Examples of the monomer represented by general formula [7] include (meth)acrylic acid, itaconic acid and sodium salts of these compounds. Further examples of the water-soluble anionic vinyl monomer include polymerizable unsaturated sulfonic acids such as 2-acrylamido-2-methylpropanesulfonic acid and sodium salts thereof.

Examples of the diallyldialkylammonium halide polymerized in accordance with the process of the present invention include diallyldimethylammonium chloride, diallyldimethylammonium bromide, diallyldiethylammonium chloride, diallyldiethylammonium bromide, diallylethylmethylammonium chloride and diallylethylmethylammonium bromide. Among these compounds, diallyldimethylammonium chloride is preferable. In the process of the present invention, homopolymers and copolymers of the diallyldialkylammonium halides can be produced and copolymers of the diallyldialkylammonium halide and a water-soluble vinyl monomer can also be produced.

The flocculant of the present invention comprises a polymer of a water-soluble radical-polymerizable monomer which is produced in accordance with the process of the present invention. As the polymer of a water-soluble radical-polymerizable monomer, any of nonionic polymers, anionic polymers, cationic polymers of dimethylaminoethyl acrylates, cationic polymers of dimethylaminoethyl methacrylates, cationic polymers of diallyldialkylammonium halides and amphoteric polymers can be used.

As the nonionic polymer, copolymers of 95 to 100% by mole of the monomer represented by general formula [6] and 0 to 5% by mole of the monomer represented by general formula [7] are preferable.

As the anionic polymer, copolymers of 5 to 50% by mole of the monomer represented by general formula [7] and 50 to 95% by mole of the monomer represented by general formula [6] are preferable. Copolymers of 20 to 40% by mole of the monomer represented by general formula [7] and 60 to 80% by mole of the monomer represented by general formula [6] are more preferable.

As the cationic polymer of dimethylaminoethyl acrylate, copolymers of 10 to 80% by mole of the monomer represented by general formula [5] in which $R^1$ represents hydrogen atom and n represents 2 and 20 to 90% by mole of the monomer represented by general formula [6] are preferable. Copolymers of 40 to 80% by mole of the monomer represented by general formula [5] in which $R^1$ represents hydrogen atom and n represents 2 and 20 to 60% by mole of the monomer represented by general formula [6] are more preferable.

As the cationic polymer of dimethylaminoethyl methacrylate, copolymers of 10 to 100% by mole of the monomer represented by general formula [5] in which $R^1$ represents methyl group and n represents 2 and 0 to 90% by mole of the monomer represented by general formula [6] are preferable. Copolymers of 40 to 100% by mole of the monomer represented by general formula [5] in which $R^1$ represents methyl group and n represents 2 and 0 to 60% by mole of the monomer represented by general formula [6] are more preferable.

As the amphoteric polymer, copolymers of 10 to 70% by mole of the monomer represented by general formula [5], 3 to 55% by mole of the monomer represented by general formula [7] and 10 to 80% by mole of the monomer represented by general formula [6] are preferable. Copolymers of 20 to 40% by mole of the monomer represented by general formula [5], 5 to 45% by mole of the monomer represented by general formula [7] and 20 to 70% by mole of the monomer represented by general formula [6] are more preferable.

The polymerization initiator used in the process of the present invention is not particularly limited. Examples of the polymerization initiator include salts of peroxodisulfuric acid, azo initiators, redox initiators and photopolymerization initiators. Examples of the salt of peroxodisulfuric acid include ammonium peroxodisulfate, sodium peroxodisulfate, potassium peroxodisulfate and barium peroxodisulfate. Examples of the azo initiator include azobisisobutyronitrile, 2,2-azobis(2-amidinopropane) dihydrochloride, 2,2-azobis(2,4-dimethylvaleronitrile), 4,4-azobis(4-cyanopentanoic acid), 2,2-azobis[2-(5-methyl-2-imidazolin-2-yl)propane] dihydrochloride, 2,2-azobis[2-(2-imidazolin-2-yl)propane] dihydrochloride and 2,2-azobis[2-(2-imidazolin-2-yl)propane]. Examples of the redox initiator include combinations of peroxides such as hydrogen peroxide, ammonium peroxodisulfate, sodium peroxodisulfate, potassium peroxodisulfate, barium peroxodisulfate, potassium permanganate, cumene hydroperoxide and benzoyl peroxide with reducing agents such as salts of sulfurous acid examples of which include sodium hydrogensulfite and sodium disulfite, iron(II) salts examples of which include iron(II) sulfate, copper(I) salts, hydroxylamine, hydrazine and dimethylaniline. Examples of the photopolymerization initiator include benzoin, benzoin methyl ether and benzoin propyl ether. Among these polymerization initiators, salts of peroxodisulfuric acid and redox initiators are preferable.

When the water-soluble radical-polymerizable monomer is polymerized in an aqueous solution, a covalent bonded species (III) which is called a dormant species is formed by the reaction of the radical of the initiator I, the monomer (I) and the nitroxy radical (II).

the polymerization can proceed in the presence of a polymerization initiator in a small amount such that, in the absence of the nitroxy radical, the amount is not sufficient for starting the polymerization and a polymer having a high molecular weight can be obtained. The obtained polymer

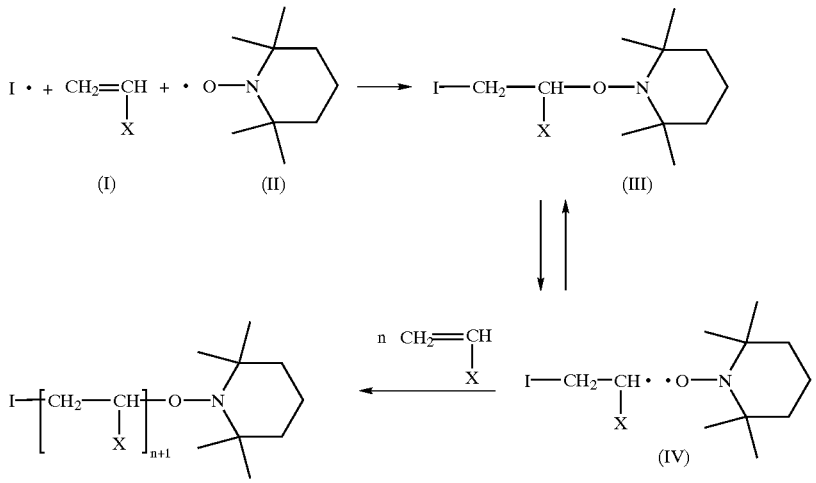

Therefore, when a redox initiator is used as the polymerization initiator and an aqueous solution containing the redox initiator, the water-soluble radical-polymerizable monomer and the nitroxy radical is heated at a temperature lower than the dissociation temperature of the dormant species, the radical formed from the redox initiator is entirely accumulated in the reaction system as the dormant species. When a considerable portion of the redox initiator has been decomposed and the dormant species has been accumulated in the reaction system, the temperature of the reaction system may be raised to a temperature above the dissociation temperature of the dormant species. In this condition, an equilibrium is formed between the dormant species and the growing radical (IV) and the entire propagation reactions start simultaneously by the addition of the monomer to the growing radical. In ordinary conditions, the rate of the reaction between two growing radicals is much faster than the rate of the addition of the monomer to the growing radical. The chain transfer reactions from the growing radical to the monomer and the polymerization initiator also take place. However, when the growing radical is in equilibrium with the dormant species, either termination reaction between two molecules of the growing radicals or the chain transfer reactions of the growing radical do not take place and the so-called living radical reaction proceeds. Since, in the reaction system, most of the propagation reactions start simultaneously and either the termination reaction or the chain transfer reactions do not take place in the early period of the propagation reaction, polymer molecules having low molecular weights are absent and a monodisperse polymer having a narrow molecular weight distribution can be obtained.

When a polymerization initiator other than the redox initiator is used and the polymerization is conducted at a temperature higher than the dissociation temperature of the dormant species, the propagation reactions do not start simultaneously and the monodisperse polymer is not obtained. However, since either the termination reaction between two molecules of the growing radicals or the chain transfer reactions from the growing radical do not take place, does not contain polymer molecules having low molecular weights but has a high molecular weight and a relatively narrow molecular weight distribution.

In accordance with the process of the present invention, the polymerization proceeds while the dormant species and the growing radical are kept in the equilibrium condition. Therefore, when the temperature of the reaction system is lowered after one of the monomers is almost entirely converted into the polymer and the reaction is completed, the nitroxy group is attached to one end of the polymer and the polymer having the nitroxy group at an end of the molecule can be obtained. That the polymer produced in accordance with the process of the present invention has the nitroxy group can be confirmed from the nuclear magnetic resonance spectrum of the polymer. Since the polymer has the nitroxy group, it is confirmed that the polymerization reaction proceeds in accordance with the mechanism shown by formula [5].

In the process of the present invention, it is preferable that the nitroxy radical is present in an amount of 0.01 to 2 mole and more preferably 0.1 to 1.5 mole per 1 mole of the polymerization initiator. When the polymerization initiator is a redox initiator, the peroxide is regarded to be the polymerization initiator and it is preferable that the nitroxy radical is present in an amount of 0.01 to 2 mole and more preferably 0.1 to 1.5 mole per 1 mole of the peroxide in the redox initiator. When the polymerization initiator is decomposed by heating, 2 moles of the initiator radical are formed from 1 mole of the polymerization initiator in most cases. When the polymerization initiator is a redox initiator, 1 mole of the initiator radical is formed from 1 mole of the peroxide. The amount of the initiator radical which effectively works for initiation of the polymerization can be obtained as the initiator efficiency of the polymerization initiator. For example, the initiator efficiency of potassium peroxodisulfate is estimated to be 10 to 20% at 40° C.

In the process of the present invention, it is preferable that the amount by mole of the nitroxy radical present in the solution is the same as the amount by mole of the formed radical of the initiator which effectively works for initiation of the polymerization. When the amount by mole of the nitroxy radical is less than the amount by mole of the formed radical of the initiator, a portion of the formed radical of the initiator do not form the dormant species and it is difficult that the complete living radical polymerization is performed. When the amount by mole of the nitroxy radical much exceeds the amount by mole of the formed radical of the initiator, the equilibrium between the dormant species and the growing radical shifts toward the dormant species and there is the possibility that the rate of polymerization decreases. Taking the initiator efficiency of the polymerization initiator in the applied condition into consideration, the amount of the nitroxy radical present in the solution can be suitably selected. When the amount of the nitroxy radical is less than 0.01 mole per 1 mole of the polymerization initiator, there is the possibility that the amount of the nitroxy radical is insufficient relative to the amount of the formed radical of the initiator. Since the amount of the initiator radical formed from the polymerization initiator is, in general, 2 mole or less per 1 mole of the polymerization initiator, it is not necessary that the nitroxy radical is present in an amount exceeding 2 moles per 1 mole of the polymerization initiator.

In the process of the present invention, it is preferable that the polymerization temperature is 10 to 60° C. and more preferably 30 to 50° C. When the initiator is a redox initiator, it is preferable that, after the dormant species is accumulated by decomposition of the redox initiator at a temperature lower than the polymerization temperature and more preferably at 0 to 10° C., the equilibrium is achieved between the dormant species and the growing radical at a temperature of 10 to 60° C. and more preferably at 20 to 50° C. and the polymerization is allowed to proceed at this temperature. When the polymerization temperature is lower than 10° C., there is the possibility that the polymerization does not proceed because the rate of decomposition of the polymerization initiator is small or the equilibrium between the dormant species and the growing radical shifts toward the dormant species. When the polymerization temperature is higher than 60° C., there is the possibility that the molecular weight of the formed polymer of a water-soluble radical-polymerizable monomer decreases.

In the process of the present invention, the amount of the polymerization initiator can be suitably selected in accordance with the type of the polymerization initiator and the polymerization temperature. For example, when potassium peroxodisulfate is used as the polymerization initiator and the polymerization temperature is 40° C., it is preferable that the concentration of potassium peroxodisulfate is 0.01 to 0.5 mmole/liter. In the process of the present invention, the polymerization time is suitably selected in accordance with the polymerization initiator, the nitroxy radical and the monomer which are used in the polymerization and the polymerization temperature. In general, it is preferable that the polymerization time is 1 to 24 hours.

When an organic macromolecular compound is used as the macromolecular flocculant, the polymer molecule are adsorbed to two or more particles to form crosslinking and flocculation by the crosslinking takes place. Since the flocculation by crosslinking takes place more easily when the adsorbed layer has a greater thickness, it is required that the macromolecular flocculant have a great molecular weight. Polymers of water-soluble radical-polymerizable monomers produced in accordance with conventional processes have broad molecular weight distributions and contain polymer molecules having low molecular weights which do not much contribute to the flocculation by crosslinking. In contrast, the polymer of a water-soluble radical-polymerizable monomer produced in accordance with the process of the present invention has a high molecular weight and does not contain polymer molecules having low molecular weight. All polymer molecules have molecular weights greater than a prescribed value and contribute to the flocculation by crosslinking. This is considered to be the reason why the excellent property as the flocculant is exhibited.

To summarize the advantages obtained by the present invention, since the polymer of a water-soluble radical-polymerizable monomer which is produced in accordance with the process of the present invention does not contain polymer molecules having low molecular weights which do not show the effect as the flocculant, the polymer exhibits the excellent property as the organic macromolecular flocculant. In accordance with the process for producing the polymer of a water-soluble radical-polymerizable monomer of the present invention, the growing radical is converted into the dormant species by the presence of the nitroxy radial in the aqueous solution which is the polymerization medium. The entire propagation reactions can be started simultaneously and the termination reaction can be suppressed. Therefore, the polymer having a narrow molecular weight distribution which does not contain polymer molecules having low molecular weights can be easily produced. The polymer of a water-soluble radical-polymerizable monomer has nitroxy group at an end of the molecule.

EXAMPLES

The present invention will be described more specifically with reference to examples in the following. However, the present invention is not limited to the examples.

In the examples, the inherent viscosity of a polymer was measured at 30° C. using a 1 mole/liter aqueous solution of sodium nitrate as the medium.

Example 1

Into a 100 ml separable flask, 11.62 g (0.06 mole) of a quaternary compound of methyl chloride with dimethylaminoethyl acrylate (DAA), 4.98 g (0.07 mole) of acrylamide (AAm), 5.04 g (0.07 mole) of acrylic acid (AA), 6.72 mg (0.039 mmole) of 4-hydroxy-2,2,6,6-tetramethyl-1-piperidinyloxy radical, 28.36 g of deionized water and 8.11 mg (0.03 mmole) of 2,2-azobis(2-amidinopropane) dihydrochloride were placed. Nitrogen gas was passed through the prepared mixed solution in the flask at a flow rate of 500 ml/minute for 2 hours in an ice bath and oxygen dissolved in the mixed solution containing the monomers was removed. The solution was heated at 50° C. for 10 hours and then 15 hours at 60° C. and the thermal polymerization was allowed to proceed. Polymer obtained in the form of gel was taken out, purified with acetone, dried in vacuo and pulverized and a powder polymer was obtained. The polymer had an inherent viscosity of 4.6 dl/g. The obtained polymer will be referred to as polymer A-1.

Example 2

The polymerization was conducted in accordance with the same procedures as those conducted in Example 1 except that 7.84 mg (0.0455 mmole) of 4-hydroxy-2,2,6,6-tetramethyl-1-piperidinyloxy radical and 9.46 mg (0.035 mmole) of 2,2-azobis(2-amidinopropane) dihydrochloride were used and a powder polymer was obtained. The polymer had an inherent viscosity of 4.6 dl/g. The obtained polymer will be referred to as polymer A-2.

Example 3

The polymerization was conducted in accordance with the same procedures as those conducted in Example 1 except that 8.96 mg (0.052 mmole) of 4-hydroxy-2,2,6,6-tetramethyl-1-piperidinyloxy radical and 10.81 mg (0.04 mmole) of 2,2-azobis(2-amidinopropane) dihydrochloride were used and a powder polymer was obtained. The polymer had an inherent viscosity of 4.7 dl/g. The obtained polymer will be referred to as polymer A-3.

Comparative Example 1

Into a 100 ml separable flask, 11.62 g (0.06 mole) of a quaternary compound of methyl chloride with dimethylaminoethyl acrylate, 4.98 g (0.07 mole) of acrylamide, 5.04 g (0.07 mole) of acrylic acid, 28.36 g of deionized water and 40.55 mg (0.15 mmole) of 2,2-azobis(2-amidinopropane) dihydrochloride were placed. Nitrogen gas was passed through the prepared mixed solution in the flask at a flow rate of 500 ml/minute for 2 hours in an ice bath and oxygen dissolved in the mixed solution containing the monomers was removed. The treated solution was heated at 40° C. and the thermal polymerization was allowed to proceed for 10 hours. Polymer obtained in the form of gel was taken out, purified with acetone, dried in vacuo and pulverized and a powder polymer was obtained. The polymer had an inherent viscosity of 4.8 dl/g. The obtained polymer will be referred to as polymer a-1.

Comparative Example 2

Into a stainless steel vessel having a glass cap, 11.62 g (0.06 mole) of a quaternary compound of methyl chloride with dimethylaminoethyl acrylate, 4.98 g (0.07 mole) of acrylamide, 5.04 g (0.07 mole) of acrylic acid, 28.36 g of deionized water and 38.15 mg (0.15 mmole) of benzoin isopropyl ether were placed. Nitrogen gas was passed through the prepared mixed solution in the vessel at a flow rate of 500 ml/minute for 2 hours in an ice bath and oxygen dissolved in the mixed solution containing the monomers was removed. The obtained solution was irradiated with ultraviolet light having a central wave length of 365 nm and the photopolymerization was allowed to proceed. Polymer obtained in the form of gel was taken out, purified with acetone, dried in vacuo and pulverized and a powder polymer was obtained. The polymer had an inherent viscosity of 4.6 dl/g. The obtained polymer will be referred to as polymer a-2.

The process of the preparation, the composition and the inherent viscosity of the polymer obtained in Examples 1 to 3 and Comparative Examples 1 and 2 are shown in Table 1.

TABLE 1

| | Polymer | Process of polymerization | Composition of polymer DAA/AAm/AA (% by mole) | Inherent viscosity (dl/g) |
|---|---|---|---|---|
| Example 1 | A-1 | living radical | 30/35/35 | 4.6 |
| Example 2 | A-2 | living radical | 30/35/35 | 4.6 |
| Example 3 | A-3 | living radical | 30/35/35 | 4.7 |
| Comparative Example 1 | a-1 | thermal | 30/35/35 | 4.8 |
| Comparative Example 2 | a-2 | light | 30/35/35 | 4.6 |

Note:
DAA: A quaternary compound of methyl chloride with dimethylaminoethyl acrylate
AAm: Acrylamide
AA: Acrylic acid

Example 4

Using polymer A-1 obtained in Example 1, surplus sludge from a sewage treatment center was subjected to a desk top test using a belt press dewatering machine. The properties of the surplus sludge were as follows: pH: 6.43; the electric conductivity: 738 mS/m; the degree of M alkali: 170 mg/liter; SS: 0.73% by weight; VSS/SS: 86.2% by weight; and the content of fiber/SS: 58.4% by weight.

Into a 500 ml beaker, 200 ml of the sludge was placed and a 20% by weight aqueous solution of ferric chloride was added to the sludge in an amount such that the concentration of ferric chloride was 1,200 mg/liter. The mixture was mixed by a hand mixer at a speed of 750 rpm for 30 seconds. To the obtained mixture, a 0.2% by weight aqueous solution of polymer A-1 was added in an amount such that the concentration of polymer A-1 was 60 mg/liter and the obtained mixture was mixed by a spatula at a speed of 180 rpm for 30 seconds. The diameter of flocks of the flocculated sludge was 4 mm. In a Büchner funnel in which nylon cloth was laid, a cylinder of a rigid vinyl chloride resin having an inner diameter of 50 mm was placed. The flocculated sludge was poured into the cylinder as quickly as possible. The amount of the filtrate was 120 ml after the gravity filtration for 20 seconds.

Example 5

The same procedures as those conducted in Example 4 were conducted except that the aqueous solution of polymer A-1 was added in an amount such that the concentration of polymer A-1 was 80 mg/liter.

The diameter of flocks of the flocculated sludge was 4 to 5 mm and the amount of the filtrate was 150 ml after the gravity filtration for 20 seconds.

The sludge accumulated on the nylon cloth after the filtration was transferred to a filter cloth for a belt press and squeezed under a pressure of 98 kPa for 1 minute and a dewatered cake was obtained. The content of water in the dewatered cake was 83.9% by weight.

Example 6

The same procedures as those conducted in Example 5 were conducted except that the aqueous solution of polymer A-1 was added in an amount such that the concentration of polymer A-1 was 100 mg/liter.

The diameter of flocks of the flocculated sludge was 4 to 5 mm and the amount of the filtrate was 154 ml after the gravity filtration for 20 seconds. The content of water in the dewatered cake was 83.9% by weight.

Example 7

The same procedures as those conducted in Example 5 were conducted except that the aqueous solution of polymer A-1 was added in an amount such that the concentration of polymer A-1 was 120 mg/liter.

The diameter of flocks of the flocculated sludge was 5 mm and the amount of the filtrate was 156 ml after the gravity filtration for 20 seconds. The content of water in the dewatered cake was 84.0% by weight.

Example 8

The same procedures as those conducted in Example 4 were conducted except that the aqueous solution of polymer A-1 was added in an amount such that the concentration of polymer A-1 was 140 mg/liter.

The diameter of flocks of the flocculated sludge was 5 mm and the amount of the filtrate was 160 ml after the gravity filtration for 20 seconds.

Examples 9 to 13

The same procedures as those conducted in Examples 4 to 8 were conducted except that polymer A-2 was used in place of polymer A-1.

Examples 14 to 18

The same procedures as those conducted in Examples 4 to 8 were conducted except that polymer A-3 was used in place of polymer A-1.

Comparative Example 3

Using polymer a-1 obtained in Comparative Example 1, the same surplus sludge as that used in Example 4 was subjected to the desk top test using a belt press dewatering machine.

Into a 500 ml beaker, 200 ml of the sludge was placed and a 20% by weight aqueous solution of ferric chloride was added to the sludge in an amount such that the concentration of ferric chloride was 1,200 mg/liter. The mixture was mixed by a hand mixer at a speed of 750 rpm for 30 seconds. To the obtained mixture, a 0.2% by weight aqueous solution of polymer a-1 was added in an amount such that the concentration of polymer a-1 was 60 mg/liter and the obtained mixture was mixed by a spatula at a speed of 180 rpm for 30 seconds. The diameter of flocks of the flocculated sludge was 1 mm and the gravity filtration was not conducted.

Comparative Example 4

The same procedures as those conducted in Comparative Example 3 were conducted except that the aqueous solution of polymer a-1 was added in an amount such that the concentration of polymer a-1 was 80 mg/liter. The diameter of flocks of the flocculated sludge was 1 mm.

Comparative Example 5

The same procedures as those conducted in Comparative Example 3 were conducted except that the aqueous solution of polymer a-1 was added in an amount such that the concentration of polymer a-1 was 100 mg/liter. The diameter of flocks of the flocculated sludge was 1 mm.

Comparative Example 6

The same procedures as those conducted in Comparative Example 3 were conducted except that the aqueous solution of polymer a-1 was added in an amount such that the concentration of polymer a-1 was 120 mg/liter. The diameter of flocks of the flocculated sludge was 1 to 2 mm. In a Büchner funnel in which nylon cloth was laid, a cylinder of a rigid vinyl chloride resin having an inner diameter of 50 mm was placed. The flocculated sludge was poured into the cylinder as quickly as possible. The amount of the filtrate was 62 ml after the gravity filtration for 20 seconds.

The sludge accumulated on the nylon cloth after the filtration was transferred to a filter cloth for a belt press and squeezed under a pressure of 98 kPa for 1 minute and a dewatered cake was obtained. The content of water in the dewatered cake was 85.0% by weight.

Comparative Example 7

The same procedures as those conducted in Comparative Example 6 were conducted except that the aqueous solution of polymer a-1 was added in an amount such that the concentration of polymer a-1 was 140 mg/liter.

The diameter of flocks of the flocculated sludge was 1 to 2 mm and the amount of the filtrate was 70 ml after the gravity filtration for 20 seconds. The content of water in the dewatered cake was 85.1% by weight.

Comparative Examples 8 to 12

The same procedures as those conducted in Comparative Examples 3 to 7 were conducted except that polymer a-2 was used in place of polymer a-1.

The results of Examples 4 to 18 are shown in Table 2 and the results of Comparative Examples 3 to 12 are shown in Table 3.

TABLE 2

| | Ferric chloride (mg/liter) | Polymer type | Polymer amount (mg/liter) | Diameter of flocks (mm) | Amount of filtrate after 20 seconds (ml) | Content of water in cake (% by wt.) |
|---|---|---|---|---|---|---|
| Example 4 | 1200 | A-1 | 60 | 4 | 120 | — |
| Example 5 | 1200 | A-1 | 80 | 4–5 | 150 | 83.9 |
| Example 6 | 1200 | A-1 | 100 | 4–5 | 154 | 83.9 |
| Example 7 | 1200 | A-1 | 120 | 5 | 156 | 84.0 |
| Example 8 | 1200 | A-1 | 140 | 5 | 160 | — |
| Example 9 | 1200 | A-2 | 60 | 4 | 124 | — |
| Example 10 | 1200 | A-2 | 80 | 4–5 | 148 | 83.7 |
| Example 11 | 1200 | A-2 | 100 | 4–5 | 156 | 83.8 |
| Example 12 | 1200 | A-2 | 120 | 5 | 154 | 83.9 |
| Example 13 | 1200 | A-2 | 140 | 5 | 158 | — |
| Example 14 | 1200 | A-3 | 60 | 4–5 | 130 | — |
| Example 15 | 1200 | A-3 | 80 | 4–5 | 152 | 83.6 |
| Example 16 | 1200 | A-3 | 100 | 5 | 156 | 83.6 |
| Example 17 | 1200 | A-3 | 120 | 5 | 160 | 83.7 |
| Example 18 | 1200 | A-3 | 150 | 5 | 158 | — |

TABLE 3

| Ferric chloride (mg/liter) | Polymer type | Polymer amount (mg/liter) | Diameter of flocks (mm) | Amount of filtrate after 20 seconds (ml) | Content of water in cake (% by wt.) |
|---|---|---|---|---|---|
| Comparative Example 3 | 1200 | a-1 | 60 | 1 | — | — |
| Comparative Example 4 | 1200 | a-1 | 80 | 1 | — | — |
| Comparative Example 5 | 1200 | a-1 | 100 | 1 | — | — |
| Comparative Example 6 | 1200 | a-1 | 120 | 1~2 | 62 | 85.0 |
| Comparative Example 7 | 1200 | a-1 | 140 | 1~2 | 70 | 85.1 |
| Comparative Example 8 | 1200 | a-2 | 60 | 1 | — | — |
| Comparative Example 9 | 1200 | a-2 | 80 | 1 | — | — |
| Comparative Example 10 | 1200 | a-2 | 100 | 1 | — | — |
| Comparative Example 11 | 1200 | a-2 | 120 | 1~2 | 72 | 85.2 |
| Comparative Example 12 | 1200 | a-2 | 140 | 1~2 | 74 | 85.3 |

As shown in Table 2, in Examples 4 to 18 in which the flocculation was conducted by using polymers A-1 to A-3 obtained in accordance with the process of the present invention, the flocks formed by the flocculation had large diameters and provided great speeds of filtration in the gravity filtration, exhibiting the excellent property of filtration. The contents of water in the dewatered cake obtained by the squeezing were small.

In contrast, in Comparative Examples 3 to 12 in which polymers a-1 and a-2, i.e., conventional macromolecular flocculants, were used, flocks formed by the flocculation had small diameters and provided small speeds of filtration in the gravity filtration, exhibiting the poor property of filtration. The contents of water in the dewatered cake obtained by the squeezing were great.

Example 19

Into a 20 ml test tube, 1.42 g (20 mmole) of acrylamide, 0.54 g (2 mmole) of 2,2-azobis(2-amidinopropane) dihydrochloride, 0.34 g (2 mmole) of 4-hydroxy-2,2,6,6-tetramethyl-1-piperidinyloxy radical and 7.7 g of pure water were placed. Nitrogen gas was passed through the prepared mixed solution in the test tube at a flow rate of 500 ml/minute for 2 hours in an ice bath and oxygen dissolved in the mixed solution was removed. The solution was heated at 60° C. for 5 hours to allow the thermal polymerization to proceed and polymer B was obtained. The obtained polymer B was analyzed in accordance with the $^{13}$C-NMR spectroscopy and the spectrum shown in FIG. 1 was obtained.

Comparative Example 13

Figure 2:
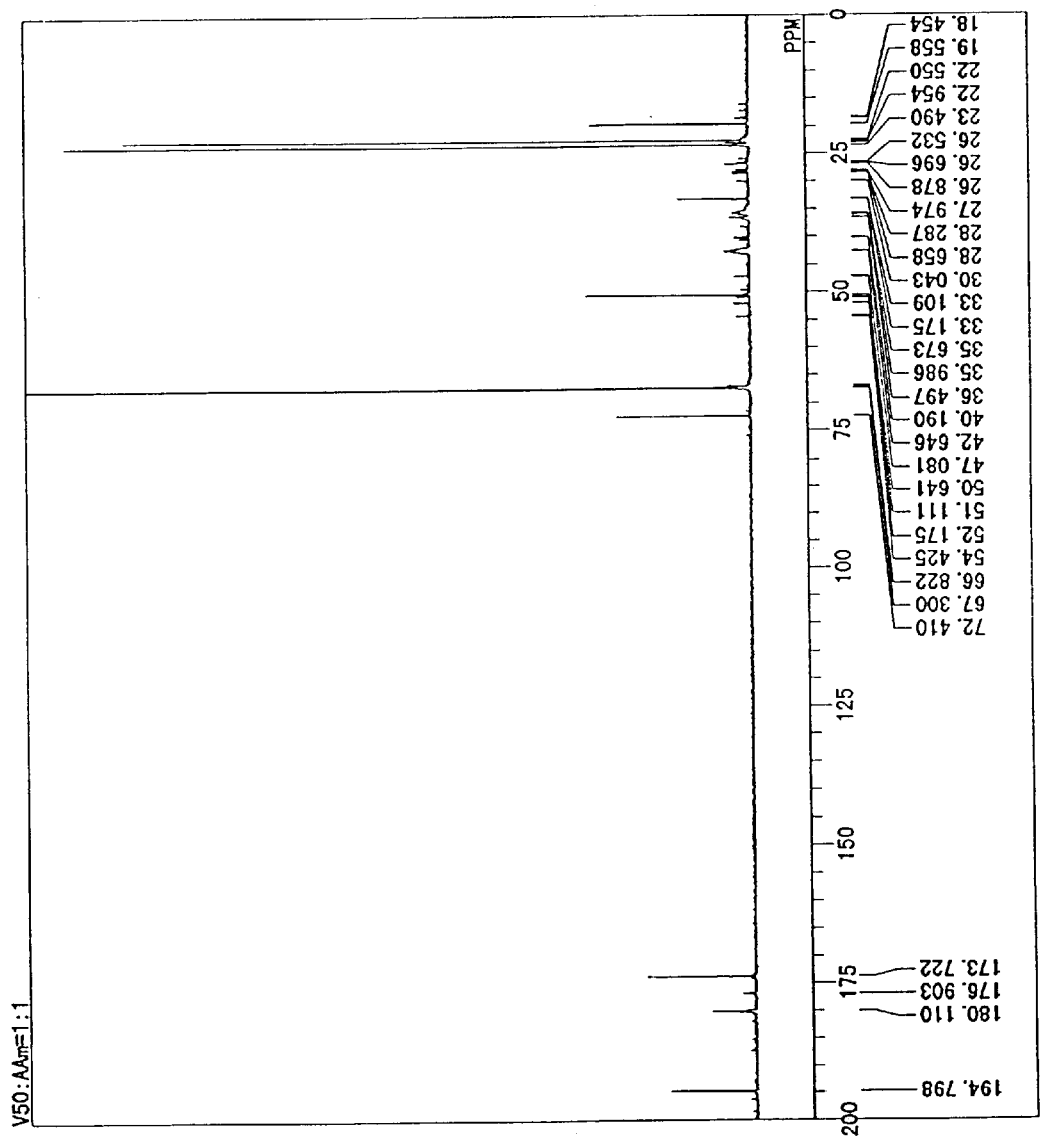
FIG. 2 shows a $^{13}$C-NMR spectrum of polymer C.

Into a 20 ml test tube, 0.71 g (10 mmole) of acrylamide, 2.70 g (10 mmole) of 2,2-azobis(2-amidinopropane) dihydrochloride and 6.59 g of pure water were placed. Nitrogen gas was passed through the prepared mixed solution in the test tube at a flow rate of 500 ml/minute for 2 hours in an ice bath and oxygen dissolved in the mixed solution was removed. The solution was heated at 60° C. for 5 hours to allow the thermal polymerization to proceed and polymer C was obtained. The obtained polymer C was analyzed in accordance with the $^{13}$C-NMR spectroscopy and the spectrum shown in FIG. 2 was obtained.

Comparative Example 14

Figure 3:
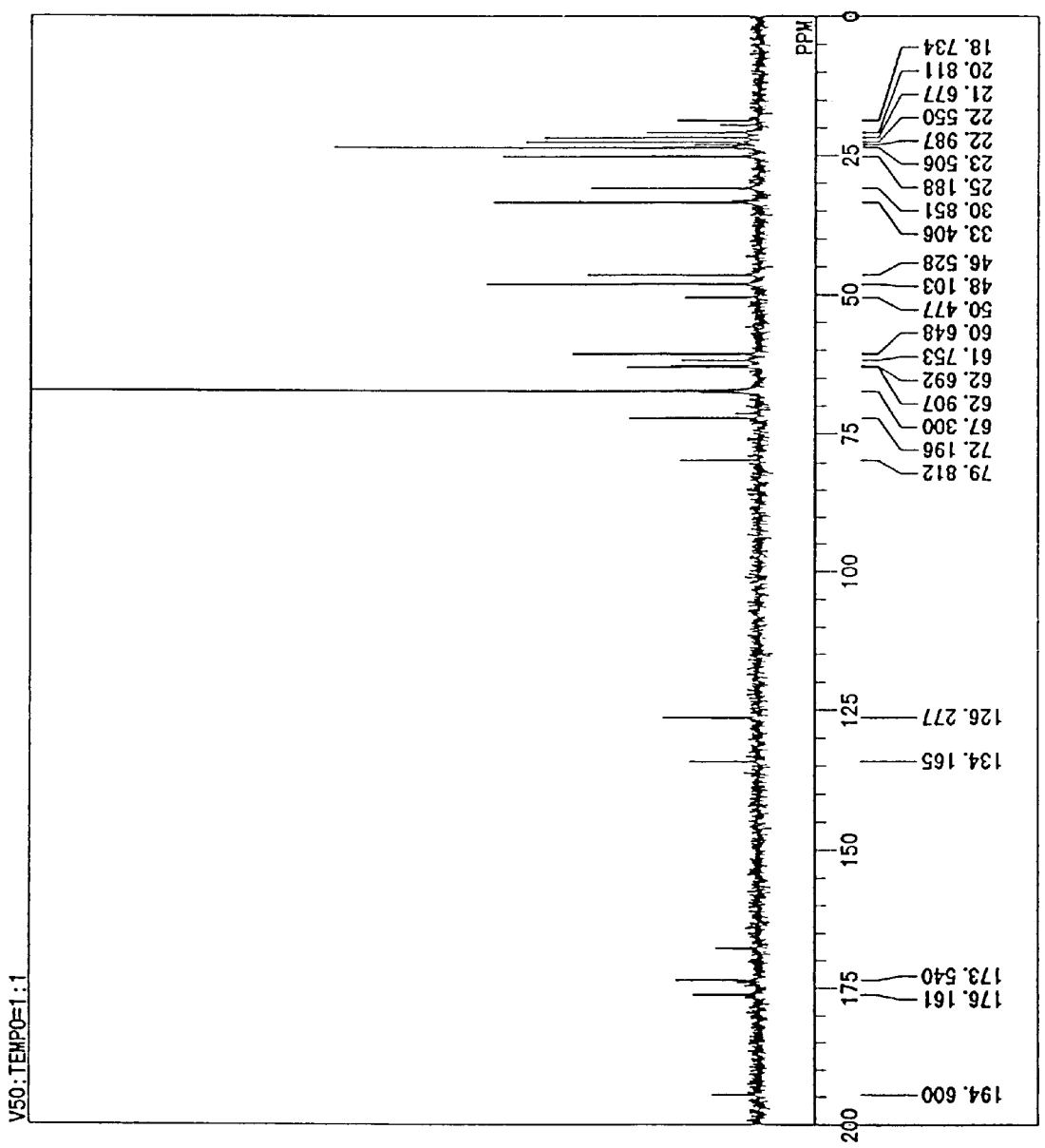
FIG. 3 shows a $^{13}$C-NMR spectrum of polymer D.

Into a 20 ml test tube, 2.70 g (10 mmole) of 2,2-azobis(2-amidinopropane) dihydrochloride, 1.72 g (10 mmole) of 4-hydroxy-2,2,6,6-tetramethyl-1-piperidinyloxy radical and 5.58 g of pure water were placed. Nitrogen gas was passed through the prepared mixed solution in the test tube at a flow rate of 500 ml/minute for 2 hours in an ice bath and oxygen dissolved in the mixed solution was removed. The solution was heated at 60° C. for 5 hours to allow the reaction to proceed and compound D was obtained. The obtained compound D was analyzed in accordance with the $^{13}$C-NMR spectroscopy and the spectrum shown in FIG. 3 was obtained.

The chemical shifts, the assignments and the presence or the absence of peaks in the NMR spectra are shown in Table 4.

TABLE 4

| Chemical shift (ppm) | Assignment | Present or absent in | | |
|---|---|---|---|---|
| | | polymer B | polymer C | compound D |
| 31.2 | carbon of methyl group in HTEMPO | present | absent | present |
| 36.5 | carbon at 3-position of AAm | present | present | absent |
| 42.6 | carbon at 2-position of AAm | present | present | absent |
| 46.9 | carbons at 3- and 5-positions of HTEMPO | present | absent | present |
| 50.6 | carbons at 2- and 6-positions of HTEMPO | present | absent | present |
| 63.0 | carbon at 4-position of HTEMPO | present | absent | present |
| 180.1 | carbon at 1-position of AAm | present | present | absent |

Note:
HTEMPO: 4-Hydroxy-2,2,6,6-tetramethyl-1-piperidinyloxy radical
AAm: Acrylamide As shown in Table 4, peaks assigned to carbons of the acrylamide unit which were present in the NMR spectrum of polymer C expressed by formula [9] and peaks assigned to 4-hydroxy-2,2,6,6-tetramethyl-1-piperidinyloxy radical which were present in the NMR spectrum of compound D expressed by formula [10] were all found in the NMR spectrum of polymer B. Therefore, it was confirmed that polymer B had a structure expressed by formula [8] in which the 4-hydroxy-2,2,6,6-tetramethyl-1-piperidinyloxy group was bonded to the acrylamide chain.

Polymer B

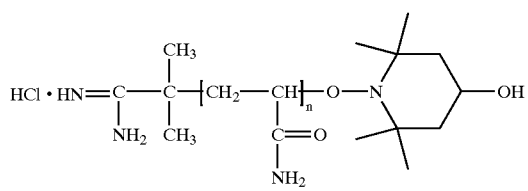

Polymer C

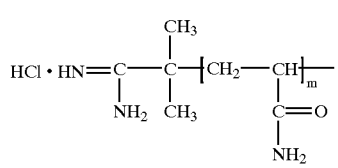

Compound D

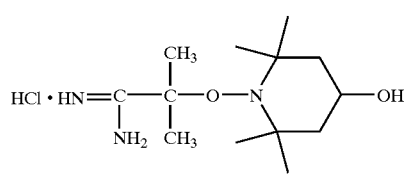

Example 20

Into a 300 ml separable flask, 1.0 g (0.005 mole) of a quaternary compound of methyl chloride with dimethylaminoethyl methacrylate (DAM), 28.1 g (0.145 mole) of a quaternary compound of methyl chloride with dimethylaminoethyl acrylate, 12.4 g (0.175 mole) of acrylamide, 12.6 g (0.175 mole) of acrylic acid, 8.1 mg (0.03 mmole) of potassium peroxodisulfate and 45.0 g of deionized water were placed and a homogeneous solution was prepared. While the prepared aqueous solution was stirred, a solution prepared by dissolving 0.94 mg (0.006 mmole) of 2,2,6,6-tetramethyl-1-piperidinyloxy radical into 0.9 ml of methanol was added and 2,2,6,6-tetramethyl-1-piperidinyloxy radical was dispersed into the aqueous solution. Nitrogen gas was passed through the aqueous solution in the flask at a flow rate of 500 ml/minute for 3 hours in an ice bath and oxygen dissolved in the aqueous solution containing the monomer mixture was removed.

The solution was heated at 40° C. and the thermal polymerization was allowed to proceed for 10 hours. Polymer obtained in the form of gel was taken out, purified with acetone, dried in vacuo and pulverized and a powder polymer was obtained. The polymer had an inherent viscosity of 6.8 dl/g. The obtained polymer will be referred to as polymer E.

Comparative Example 15

Into a 300 ml separable flask, 1.0 g (0.005 mole) of a quaternary compound of methyl chloride with dimethylaminoethyl methacrylate, 28.1 g (0.145 mole) of a quaternary compound of methyl chloride with dimethylaminoethyl acrylate, 12.4 g (0.175 mole) of acrylamide, 12.6 g (0.175 mole) of acrylic acid, 27.0 mg (0.1 mmole) of potassium peroxodisulfate and 45.9 g of deionized water were placed and a homogeneous solution was prepared. Nitrogen gas was passed through the prepared solution in the flask at a flow rate of 500 ml/minute for 3 hours in an ice bath and oxygen dissolved in the aqueous solution containing the monomer mixture was removed.

The solution was heated at 40° C. and the thermal polymerization was allowed to proceed for 10 hours. Polymer obtained in the form of gel was taken out, purified with acetone, dried in vacuo and pulverized and a powder polymer was obtained. The polymer had an inherent viscosity of 8.0 dl/g. The obtained polymer will be referred to as polymer b.

Comparative Example 16

Into a 300 ml separable flask, 1.0 g (0.005 mole) of a quaternary compound of methyl chloride with dimethylaminoethyl methacrylate, 28.1 g (0.145 mole) of a quaternary compound of methyl chloride with dimethylaminoethyl acrylate, 12.4 g (0.175 mole) of acrylamide, 12.6 g (0.175 mole) of acrylic acid and 45.0 g of deionized water were placed and a homogeneous solution was prepared. While the prepared aqueous solution was stirred, a solution prepared by dissolving 25.4 mg (0.1 mmole) of benzoin isopropyl ether into 0.9 ml of methanol was added and benzoin isopropyl ether was dispersed into the aqueous solution. Nitrogen gas was passed through the aqueous solution in the flask at a flow rate of 500 ml/minute for 3 hours in an ice bath and oxygen dissolved in the aqueous solution containing the monomer mixture was removed.

The obtained solution was transferred into a stainless steel vessel having a glass cap which was purged with nitrogen in advance and irradiated with ultraviolet light having a central wave length of 365 nm and the photopolymerization was allowed to proceed for 1 hour. The stainless steel vessel was kept at 15° C. during the polymerization. Polymer obtained in the form of gel was taken out, purified with acetone, dried in vacuo and pulverized and a powder polymer was obtained. The polymer had an inherent viscosity of 8.0 dl/g. The obtained polymer will be referred to as polymer c.

The processes of the polymerization, the compositions and the inherent viscosities of the polymers obtained in Example 20 and Comparative Examples 15 and 16 are shown in Table 5.

TABLE 5

| | Polymer | Process of polymerization | Composition of polymer DAM/DAA/AAm/AA (% by mole) | Inherent viscosity (dl/g) |
|---|---|---|---|---|
| Example 20 | E | living radical | 1/29/35/35 | 6.8 |
| Comparative Example 15 | b | thermal | 1/29/35/35 | 8.0 |
| Comparative Example 16 | c | light | 1/29/35/35 | 8.0 |

Note:
DAM: A quaternary compound of methyl chloride with dimethylaminoethyl methacrylate
DAA: A quaternary compound of methyl chloride with dimethylaminoethyl acrylate
AAm: Acrylamide
AA: Acrylic acid Example 21

Using polymer E obtained in Example 20, mixed sludge from a sewage treatment center was subjected to a desk top test using a belt press dewatering machine. The properties of the mixed sludge were as follows: pH: 5.6; the electric conductivity: 103.8 mS/m; SS: 1.64% by weight; VSS/SS: 85.8% by weight; and the content of fiber/SS: 30.1% by weight.

Into a 500 ml beaker, 200 ml of the sludge was placed and a 20% by weight aqueous solution of ferric chloride was added to the sludge in an amount such that the concentration of ferric chloride was 3,000 mg/liter. The mixture was then mixed by a hand mixer at a speed of 750 rpm for 30 seconds. To the obtained mixture, a 0.2% by weight aqueous solution of polymer E was added in an amount such that the concentration of polymer E was 60 mg/liter and the obtained mixture was mixed by a spatula at a speed of 180 rpm for 30 seconds. The diameter of flocks of the flocculated sludge was 4 mm. In a Büchner funnel in which nylon cloth was laid, a cylinder of a rigid vinyl chloride resin having an inner diameter of 50 mm was placed. The flocculated sludge was poured into the cylinder as quickly as possible. The amount of the filtrate was 118 ml after the gravity filtration for 20 seconds.

The sludge accumulated on the nylon cloth after the filtration was transferred to a filter cloth for a belt press and squeezed under a pressure of 98 kPa for 1 minute and a dewatered cake was obtained. The content of water in the dewatered cake was 71.9% by weight.

Example 22

The same procedures as those conducted in Example 21 were conducted except that the aqueous solution of polymer E was added in an amount such that the concentration of polymer E was 80 mg/liter.

The diameter of flocks of the flocculated sludge was 5 mm and the amount of the filtrate was 120 ml after the gravity filtration for 20 seconds. The content of water in the dewatered cake was 72.3% by weight.

Example 23

The same procedures as those conducted in Example 21 were conducted except that the aqueous solution of polymer E was added in an amount such that the concentration of polymer E was 100 mg/liter.

The diameter of flocks of the flocculated sludge was 6 mm and the amount of the filtrate was 116 ml after the gravity filtration for 20 seconds. The content of water in the dewatered cake was 72.3% by weight.

Comparative Example 17

Using polymer b which was prepared by the thermal polymerization in Comparative Example 15 and had the same monomer composition as that of polymer E obtained in Example 20 and an inherent viscosity of 8.0 dl/g was used in place of polymer E, the same mixed sludge from a sewage treatment center as that used in Example 21 was subjected to the desk top test using a belt press dewatering machine.

Into a 500 ml beaker, 200 ml of the sludge was placed and a 20% by weight aqueous solution of ferric chloride was added to the sludge in an amount such that the concentration of ferric chloride was 3,000 mg/liter. The mixture was mixed by a hand mixer at a speed of 750 rpm for 30 seconds. To the obtained mixture, a 0.2% by weight aqueous solution of polymer b was added in an amount such that the concentration of polymer b was 80 mg/liter and the obtained mixture was mixed by a spatula at a speed of 180 rpm for 30 seconds. The diameter of flocks of the flocculated sludge was 2 mm. In a Büchner funnel in which nylon cloth was laid, a cylinder of a rigid vinyl chloride resin having an inner diameter of 50 mm was placed. The flocculated sludge was poured into the cylinder as quickly as possible. The amount of the filtrate was 52 ml after the gravity filtration for 20 seconds.

The sludge accumulated on the nylon cloth after the filtration was transferred to a filter cloth for a belt press and squeezed under a pressure of 98 kPa for 1 minute and a dewatered cake was obtained. The content of water in the dewatered cake was 73.9% by weight.

Comparative Example 18

The same procedures as those conducted in Comparative Example 17 were conducted except that the aqueous solution of polymer b was added in an amount such that the concentration of polymer b was 100 mg/liter.

The diameter of flocks of the flocculated sludge was 3 mm and the amount of the filtrate was 88 ml after the gravity filtration for 20 seconds. The content of water in the dewatered cake was 73.1% by weight.

Comparative Example 19

The same procedures as those conducted in Comparative Example 17 were conducted except that the aqueous solution of polymer b was added in an amount such that the concentration of polymer b was 120 mg/liter.

The diameter of flocks of the flocculated sludge was 3 mm and the amount of the filtrate was 68 ml after the gravity filtration for 20 seconds. The content of water in the dewatered cake was 73.1% by weight.

Comparative Example 20

Using polymer c which was prepared by the photopolymerization in Comparative Example 16 and had the same monomer composition as that of polymer E obtained in Example 20 and an inherent viscosity of 8.0 dl/g in place of polymer E, the same mixed sludge from a sewage treatment center as that used in Example 21 was subjected to the desk top test using a belt press dewatering machine.

Into a 500 ml beaker, 200 ml of the sludge was placed and a 20% by weight aqueous solution of ferric chloride was added to the sludge in an amount such that the concentration of ferric chloride was 3,000 mg/liter. The mixture was mixed by a hand mixer at a speed of 750 rpm for 30 seconds. To the obtained mixture, a 0.2% by weight aqueous solution of polymer c was added in an amount such that the concentration of polymer c was 100 mg/liter and the obtained mixture was mixed by a spatula at a speed of 180 rpm for 30 seconds. The diameter of flocks of the flocculated sludge was 1 mm and the gravity filtration was not conducted.

Comparative Example 21

The same procedures as those conducted in Comparative Example 20 were conducted except that the aqueous solution of polymer c was added in an amount such that the concentration of polymer c was 120 mg/liter. The diameter of flocks of the flocculated sludge was 1 mm.

Comparative Example 22

The same procedures as those conducted in Comparative Example 20 were conducted except that the aqueous solution of polymer c was added in an amount such that the concentration of polymer c was 140 mg/liter. The diameter of flocks of the flocculated sludge was 1 mm.

The results of the test of flocculation and filtration and the test of squeezing in Examples 21 to 23 and Comparative Examples 17 to 22 are shown in Table 6.

TABLE 6

| | Ferric chloride (mg/liter) | Polymer type | Polymer amount (mg/liter) | Diameter of flocks (mm) | Amount of filtrate after 20 seconds (ml) | Content of water in cake (% by wt.) |
|---|---|---|---|---|---|---|
| Example 21 | 3000 | E | 60 | 4 | 118 | 71.9 |
| Example 22 | 3000 | E | 80 | 5 | 120 | 72.3 |
| Example 23 | 3000 | E | 100 | 6 | 116 | 72.3 |
| Comparative Example 17 | 3000 | b | 80 | 2 | 52 | 73.9 |
| Comparative Example 18 | 3000 | b | 100 | 3 | 88 | 73.1 |
| Comparative Example 19 | 3000 | b | 120 | 3 | 68 | 73.1 |
| Comparative Example 20 | 3000 | c | 100 | 1 | — | — |
| Comparative Example 21 | 3000 | c | 120 | 1 | — | — |
| Comparative Example 22 | 3000 | c | 140 | 1 | — | — |

As shown in Table 6, in Examples 21 to 23 in which the flocculation was conducted by using polymer E obtained in accordance with the process of the present invention, the flocks formed by the flocculation had large diameters and provided great speeds of filtration in the gravity filtration, exhibiting the excellent property of filtration. The contents of water in the dewatered cake obtained by the squeezing were small.

In contrast, in Comparative Examples 17 to 19 in which polymer b, i.e., a conventional macromolecular flocculant, was used, flocks formed by the flocculation had small diameters and provided small speeds of filtration in the gravity filtration, exhibiting the poor property of filtration. The contents of water in the dewatered cake obtained by the squeezing were great. In Comparative Examples 20 to 22 in which the flocculation was conducted using polymer c, the flocks formed by the flocculation had extremely small diameters and the filtration test could not be conducted.

Example 24

Into a 300 ml separable flask, 1.0 g (0.005 mole) of a quaternary compound of methyl chloride with dimethylaminoethyl methacrylate, 28.1 g (0.145 mole) of a quaternary compound of methyl chloride with dimethylaminoethyl acrylate, 12.4 g (0.175 mole) of acrylamide, 12.6 g (0.175 mole) of acrylic acid, 0.81 mg (0.003 mmole) of potassium peroxodisulfate and 45.0 g of deionized water were placed and a homogeneous solution was prepared. While the prepared aqueous solution was stirred, a solution prepared by dissolving 0.09 mg (0.0006 mmole) of 2,2,6,6-tetramethyl-1-piperidinyloxy radical into 0.9 ml of methanol was added and 2,2,6,6-tetramethyl-1-piperidinyloxy radical was dispersed into the aqueous solution. Nitrogen gas was passed through the aqueous solution in the flask at a flow rate of 500 ml/minute for 3 hours in an ice bath and oxygen dissolved in the aqueous solution containing the monomer mixture was removed.

The solution was heated at 40° C. and the thermal polymerization was allowed to proceed for 10 hours. Polymer obtained in the form of gel was taken out, purified with acetone, dried in vacuo and pulverized and a powder polymer was obtained. The polymer had an inherent viscosity of 8.2 dl/g. The obtained polymer will be referred to as polymer F.

Example 25

The same procedures as those conducted in Example 24 was conducted except that the polymerization temperature was 65° C.

After the polymerization was allowed to proceed for 10 hours, polymer obtained in the form of gel was taken out, purified with acetone, dried in vacuo and pulverized and a powder polymer was obtained. The polymer had an inherent viscosity of 5.2 dl/g.

Example 26

The same procedures as those conducted in Example 24 was conducted except that the amount of potassium peroxodisulfate was 27.03 mg (0.1 mmole) and the amount of 2,2,6,6-tetramethyl-1-piperidinyloxy radical was 3.13 mg (0.02 mmole).

After the polymerization was allowed proceed for 10 hours, polymer obtained in the form of gel was taken out, purified with acetone, dried in vacuo and pulverized and a powder polymer was obtained. The polymer had an inherent viscosity of 5.5 dl/g.

Comparative Example 23

The same procedures as those conducted in Example 24 was conducted except that 2,2,6,6-tetramethyl-1-piperidinyloxy radical was not added. The polymerization did not proceed after 10 hours and no polymer could be obtained.

The results obtained in Examples 24 to 26 and Comparative Example 23 are shown in Table 7.

TABLE 7

| | DAM (g) | DAA (g) | AAm (g) | AA (g) | KPS (g) | TEMPO (g) | TEMPO /KPS (ratio by mole) | Polymerization temperature (° C.) | Inherent viscosity (dl/g) |
|---|---|---|---|---|---|---|---|---|---|
| Example 24 | 1.0 | 28.1 | 12.4 | 12.6 | 0.81 | 0.09 | 0.2 | 40 | 8.2 |
| Example 25 | 1.0 | 28.1 | 12.4 | 12.6 | 0.81 | 0.09 | 0.2 | 65 | 5.2 |

TABLE 7-continued

|  | DAM (g) | DAA (g) | AAm (g) | AA (g) | KPS (g) | TEMPO (g) | TEMPO /KPS (ratio by mole) | Polymerization temperature (° C.) | Inherent viscosity (dl/g) |
| --- | --- | --- | --- | --- | --- | --- | --- | --- | --- |
| Example 26 | 1.0 | 28.1 | 12.4 | 12.6 | 27.03 | 3.13 | 0.2 | 40 | 5.5 |
| Comparative Example 23 | 1.0 | 28.1 | 12.4 | 12.6 | 0.81 | 0 | 0 | 40 | not polymerized |

Note:
DAM: A quaternary compound of methyl chloride with dimethylaminoethyl methacrylate
DAA: A quaternary compound of methyl chloride with dimethylaminoethyl acrylate
AAm: Acrylamide
AA: Acrylic acid
KPS: Potassium peroxodisulfate
TEMPO: 2,2,6,6-tetramethyl-1-piperidinyloxy radical As shown in Table 7, in Example 24 in which 2,2,6,6-tetramethyl-1-piperidinyloxy radical was present in an amount of 0.2 mole per 1 mole of potassium peroxodisulfate and the polymerization temperature was 40° C., the high molecular weight polymer having an inherent viscosity as high as 8.2 dl/g was obtained. In contrast, in Example 25 in which the polymerization temperature was 65° C., the obtained polymer had a lower molecular weight. In Example 26, although the amount by mole of 2,2,6,6-tetramethyl-1-piperidinyloxy radical per 1 mole of potassium peroxodisulfate was the same as that in Example 24, i.e., 0.2 mole, the molecular weight of the obtained polymer decreased due to a greater amount of the polymerization initiator. Therefore, it is preferable that the polymerization temperature and the amount of the polymerization initiator are selected taking other conditions of the polymerization into consideration.

In Comparative Example 23 in which potassium peroxodisulfate was used in the same amount as that used in Example 24 but 2,2,6,6-tetramethyl-1-piperidinyloxy radical was not added, the polymerization did not proceed. In contrast, the high molecular weight polymer could be obtained in Example 24. This shows that, when 2,2,6,6-tetramethyl-1-piperidinyloxy radical is present, the living radical polymerization takes place and the polymerization effectively proceeds even in the presence of a polymerization initiator in a small amount such that the ordinary thermal polymerization does not proceed.

Comparative Example 24

Into a 300 ml separable flask, 1.0 g (0.005 mole) of a quaternary compound of methyl chloride with dimethylaminoethyl methacrylate, 28.1 g (0.145 mole) of a quaternary compound of methyl chloride with dimethylaminoethyl acrylate, 12.4 g (0.175 mole) of acrylamide, 12.6 g (0.175 mole) of acrylic acid, 27.0 mg (0.1 mmole) of potassium peroxodisulfate and 45.9 g of deionized water were placed and a homogeneous solution was prepared. Nitrogen gas was passed through the prepared solution in the flask at a flow rate of 500 ml/minute for 3 hours in an ice bath and oxygen dissolved in the aqueous solution containing the monomer mixture was removed.

The solution was heated at 40° C. and the thermal polymerization was allowed to proceed for 10 hours. Polymer obtained in the form of gel was taken out, purified with acetone, dried in vacuo and pulverized and a powder polymer was obtained. The polymer had an inherent viscosity of 8.0 dl/g. The obtained polymer will be referred to as polymer d.

Comparative Example 25

Into a 300 ml separable flask, 1.0 g (0.005 mole) of a quaternary compound of methyl chloride with dimethylaminoethyl methacrylate, 28.1 (0.145 mole) of a quaternary compound of methyl chloride with dimethylaminoethyl acrylate, 12.4 g (0.175 mole) of acrylamide, 12.6 g (0.175 mole) of acrylic acid and 45.0 g of deionized water were placed and a homogeneous solution was prepared. While the prepared aqueous solution was stirred, a solution prepared by dissolving 25.4 mg (0.1 mmole) of benzoin isopropyl ether into 0.9 ml of methanol was added and benzoin isopropyl ether was dispersed into the aqueous solution. Nitrogen gas was passed through the aqueous solution in the flask at a flow rate of 500 ml/minute for 3 hours in an ice bath and oxygen dissolved in the aqueous solution containing the monomer mixture was removed.

The obtained solution was transferred into a stainless steel vessel having a glass cap which was purged with nitrogen in advance and irradiated with ultraviolet light having a central wave length of 365 nm and the photopolymerization was allowed to proceed for 1 hour. The stainless steel vessel was kept at 15° C. during the polymerization. Polymer obtained in the form of gel was taken out, purified with acetone, dried in vacuo and pulverized and a powder polymer was obtained. The polymer had an inherent viscosity of 8.0 dl/g. The obtained polymer will be referred to as polymer e.

The processes of the polymerization, the compositions and the inherent viscosities of the polymers obtained in Example 24 and Comparative Examples 24 and 25 are shown in Table 8.

TABLE 8

|  | Polymer | Process of polymerization | Composition of polymer DAM/ DAA/AAm/AA (% by mole) | Inherent viscosity (dl/g) |
| --- | --- | --- | --- | --- |
| Example 24 | F | living radical | 1/29/35/35 | 8.2 |
| Comparative Example 24 | d | thermal | 1/29/35/35 | 8.0 |
| Comparative Example 25 | e | light | 1/29/35/35 | 8.0 |

Note:
DAM: A quaternary compound of methyl chloride with dimethylaminoethyl methacrylate
DAA: A quaternary compound of methyl chloride with dimethylaminoethyl acrylate
AAm: Acrylamide
AA: Acrylic acid Example 27

Using polymer F obtained in Example 24, digested sludge from a sewage treatment center was subjected to a desk top test using a belt press dewatering machine. The properties of the sludge were as follows: pH: 6.70; the electric conductivity: 0.6 mS/m; SS: 1.84% by weight; VSS/SS: 59.7% by weight; and the content of fiber/SS: 3.0% by weight.

Into a 500 ml stainless steel vessel, 200 ml of the sludge was placed and stirred at a speed of 5,000 rpm using a homogenizer (manufactured by NIHONSEIKI KAISHA; EXCEL AUTO HOMOGENIZER). When the speed of rotation was stabilized, a 20% by weight aqueous solution of iron polysulfate was added to the sludge in an amount such that the concentration of iron polysulfate was 3,000 mg/liter. To the obtained mixture, a 0.2% by weight aqueous solution of polymer F was added in an amount such that the concentration of polymer F was 100 mg/liter and the obtained mixture was stirred for 5 seconds. The diameter of flocks of the flocculated sludge was 8 mm. In a Büchner funnel in which nylon cloth was laid, a cylinder of a rigid vinyl chloride resin having an inner diameter of 50 mm was placed. The flocculated sludge was poured into the cylinder as quickly as possible. The amount of the filtrate was 138 ml after the gravity filtration for 20 seconds.

The sludge accumulated on the nylon cloth after the filtration was transferred to a filter cloth for a belt press and squeezed under a pressure of 49 kPa for 1 minute and a dewatered cake was obtained. The content of water in the dewatered cake was 75.2% by weight.

Comparative Example 26

The same procedures as those conducted in Example 27 were conducted except that polymer d which was prepared by the thermal polymerization in Comparative Example 24 and had the same monomer composition as that of polymer F and an inherent viscosity of 8.0 dl/g was used in place of polymer F and an aqueous solution of polymer d was added in an amount such that the concentration of polymer d was 200 mg/liter.

The diameter of flocks of the flocculated sludge was 3 mm and the amount of the filtrate was 64 ml after the gravity filtration for 20 seconds. The content of water in the dewatered cake was 75.4% by weight.

Comparative Example 27

The same procedures as those conducted in Comparative Example 26 were conducted except that the aqueous solution of polymer d was added in an amount such that the concentration of polymer d was 250 mg/liter.

The diameter of flocks of the flocculated sludge was 4.5 mm and the amount of the filtrate was 76 ml after the gravity filtration for 20 seconds. The content of water in the dewatered cake was 75.5% by weight.

Comparative Example 28

The same procedures as those conducted in Example 27 were conducted except that polymer e which was prepared by the photopolymerization in Comparative Example 25 and had the same monomer composition as that of polymer F and an inherent viscosity of 8.0 dl/g was used in place of polymer F obtained in Example 24 and an aqueous solution of polymer e was added in an amount such that the concentration of polymer e was 200 mg/liter.

The diameter of flocks of the flocculated sludge was 3 mm and the amount of the filtrate was 80 ml after the gravity filtration for 20 seconds. The content of water in the dewatered cake was 75.7% by weight.

Comparative Example 29

The same procedures as those conducted in Comparative Example 28 were conducted except that the aqueous solution of polymer e was added in an amount such that the concentration of polymer e was 250 mg/liter.

The diameter of flocks of the flocculated sludge was 4.5 mm and the amount of the filtrate was 76 ml after the gravity filtration for 20 seconds. The content of water in the dewatered cake was 75.8% by weight.

The results obtained in Examples 27 and Comparative Examples 26 to 29 are shown in Table 9.

TABLE 9

| | Ion polysulfate (mg/liter) | Polymer type | Polymer amount (mg/liter) | Diameter of flocks (mm) | Amount of filtrate after 20 seconds (ml) | Content of water in cake (% by wt.) |
|---|---|---|---|---|---|---|
| Example 27 | 3000 | F | 100 | 8 | 138 | 75.2 |
| Comparative Example 26 | 3000 | d | 200 | 3 | 64 | 75.4 |
| Comparative Example 27 | 3000 | d | 250 | 4.5 | 76 | 75.5 |
| Comparative Example 28 | 3000 | e | 200 | 3 | 80 | 75.7 |
| Comparative Example 29 | 3000 | e | 250 | 4.5 | 76 | 75.8 |

As shown in Table 9, in Example 27 in which the flocculation was conducted using polymer F obtained in accordance with the process of the present invention, the flocks formed by the flocculation had large diameters and provided great speeds of filtration in the gravity filtration, exhibiting the excellent property of filtration. The contents of water in the dewatered cake obtained by the squeezing were small.

In contrast, in Comparative Example 26 to 29 in which polymer d or polymer e, i.e., a conventional flocculant, was used, the flocks formed by the flocculation had small diameters even when the amount of the flocculant was increased, the speed of filtration in the gravity filtration was small, showing the poor property of filtration. The contents of water in the dewatered cake obtained by the squeezing were great Example 28

Using polymer F obtained in Example 24, mixed sludge from a sewage treatment center was subjected to a desk top test using a belt press dewatering machine. The properties of the mixed sludge were as follows: pH: 5.86; the electric conductivity: 114.2 mS/m; SS: 1.68% by weight; VSS/SS: 83.2% by weight; and the content of fiber/SS: 27.3% by weight.

Into a 500 ml beaker, 200 ml of the sludge was placed and a 20% by weight aqueous solution of ferric chloride was added to the sludge in an amount such that the concentration of ferric chloride was 3,000 mg/liter. The mixture was then mixed by a hand mixer at a speed of 750 rpm for 30 seconds. To the obtained mixture, a 0.2% by weight aqueous solution of polymer F was added in an amount such that the concentration of polymer F was 60 mg/liter and the obtained mixture was mixed by a spatula at a speed of 180 rpm for 30 seconds. The diameter of flocks of the flocculated sludge was 4 mm. In a Büchner funnel in which nylon cloth was laid, a cylinder of a rigid vinyl chloride resin having an inner diameter of 50 mm was placed. The flocculated sludge was poured into the cylinder as quickly as possible. The amount of the filtrate was 123 ml after the gravity filtration for 20 seconds.

The sludge accumulated on the nylon cloth after the filtration was transferred to a filter cloth for a belt press and squeezed under a pressure of 98 kPa for 1 minute and a dewatered cake was obtained. The content of water in the dewatered cake was 71.5% by weight.

Example 29

The same procedures as those conducted in Example 28 were conducted except that the aqueous solution of polymer F was added in an amount such that the concentration of polymer F was 80 mg/liter.

The diameter of flocks of the flocculated sludge was 5 mm and the amount of the filtrate was 128 ml after the gravity filtration for 20 seconds. The content of water in the dewatered cake was 71.8% by weight.

Example 30

The same procedures as those conducted in Example 28 were conducted except that the aqueous solution of polymer F was added in an amount such that the concentration of polymer F was 100 mg/liter.

The diameter of flocks of the flocculated sludge was 6 mm and the amount of the filtrate was 118 ml after the gravity filtration for 20 seconds. The content of water in the dewatered cake was 72.1% by weight.

Comparative Example 30

The same procedures as those conducted in Example 28 were conducted except that polymer d which was prepared by the thermal polymerization in Comparative Example 24 and had the same monomer composition as that of polymer F and an inherent viscosity of 8.0 dl/g was used in place of polymer F and an aqueous solution of polymer d was added in an amount such that the concentration of polymer d was 80 mg/liter.

The diameter of flocks of the flocculated sludge was 2 mm and the amount of the filtrate was 58 ml after the gravity filtration for 20 seconds. The content of water in the dewatered cake was 72.8% by weight.

Comparative Example 31

The same procedures as those conducted in Comparative Example 30 were conducted except that the aqueous solution of polymer d was added in an amount such that the concentration of polymer d was 100 mg/liter.

The diameter of flocks of the flocculated sludge was 3 mm and the amount of the filtrate was 84 ml after the gravity filtration for 20 seconds. The content of water in the dewatered cake was 72.7% by weight.

Comparative Example 32

The same procedures as those conducted in Comparative Example 30 were conducted except that the aqueous solution of polymer d was added in an amount such that the concentration of polymer d was 120 mg/liter.

The diameter of flocks of the flocculated sludge was 3 mm and the amount of the filtrate was 66 ml after the gravity filtration for 20 seconds. The content of water in the dewatered cake was 72.8% by weight.

Comparative Example 33

The same procedures as those conducted in Example 28 were conducted except that polymer e which was prepared by the photopolymerization in Comparative Example 25 and had the same monomer composition as that of polymer F and an inherent viscosity of 8.0 dl/g was used in place of polymer F obtained in Example 24 and an aqueous solution of polymer e was added in an amount such that the concentration of polymer e was 100 mg/liter. The diameter of flocks of the flocculated sludge was 1 mm and the test of the gravity filtration was not conducted.

Comparative Example 34

The same procedures as those conducted in Comparative Example 33 were conducted except that the aqueous solution of polymer e was added in an amount such that the concentration of polymer e was 120 mg/liter. The diameter of flocks of the flocculated sludge was 1 mm.

Comparative Example 35

The same procedures as those conducted in Comparative Example 33 were conducted except that the aqueous solution of polymer e was added in an amount such that the concentration of polymer e was 140 mg/liter. The diameter of flocks of the flocculated sludge was 1 mm.

The results obtained in Examples 28 to 30 and Comparative Examples 30 to 35 are shown in Table 10.

TABLE 10

| | Ferric chloride (mg/liter) | Polymer type | Polymer amount (mg/liter) | Diameter of flocks (mm) | Amount of filtrate after 20 seconds (ml) | Content of water in cake (% by wt.) |
|---|---|---|---|---|---|---|
| Example 28 | 3000 | F | 60 | 4 | 123 | 71.5 |
| Example 29 | 3000 | F | 80 | 5 | 128 | 71.8 |
| Example 30 | 3000 | F | 100 | 6 | 118 | 72.1 |
| Comparative Example 30 | 3000 | d | 80 | 2 | 58 | 72.8 |
| Comparative Example 31 | 3000 | d | 100 | 3 | 84 | 72.7 |
| Comparative Example 32 | 3000 | d | 120 | 3 | 66 | 72.8 |
| Comparative Example 33 | 3000 | e | 100 | 1 | — | — |
| Comparative Example 34 | 3000 | e | 120 | 1 | — | — |
| Comparative Example 35 | 3000 | e | 140 | 1 | — | — |

As shown in Table 10, in Examples 28 to 30 in which the flocculation was conducted using polymer F obtained in accordance with the process of the present invention, the flocks formed by the flocculation had large diameters and provided great speeds of filtration in the gravity filtration, exhibiting the excellent property of filtration. The contents of water in the dewatered cake obtained by the squeezing were small.

In contrast, in Comparative Examples 30 to 32 in which the flocculation was conducted using polymer d, i.e., a conventional flocculant, the flocks formed by the flocculation had small diameters and provided small speeds of filtration in the gravity filtration, exhibiting the poor property of filtration. The contents of water in the dewatered cake obtained by the squeezing were great. In Comparative Examples 33 to 35 in which the flocculation was conducted using polymer e, the diameters of the flocks formed by the flocculation were extremely small and the test of the gravity filtration could not be conducted.

Example 31

Into a 300 ml separable flask, 32.3 g (0.2 mole) of diallyldimethylammonium chloride and 64.7 g of deionized water were placed and a homogeneous solution was prepared. While the prepared aqueous solution was stirred, a solution prepared by dissolving 20.3 g (0.13 mmole) of 2,2,6,6-tetramethyl-1-piperidinyloxy radical into 1.0 ml of methanol was added to the aqueous solution and 2,2,6,6-tetramethyl-1-piperidinyloxy radical was dispersed into the aqueous solution. Nitrogen gas was passed through the aqueous solution in the flask at a flow rate of 500 ml/minute for 3 hours in an ice bath and oxygen dissolved in the aqueous solution containing the monomer mixture was removed. While the aqueous solution was stirred, a solution prepared by dissolving 22.8 g (0.1 mmole) of ammonium peroxodisulfate into 1.0 ml of deionized water was added to the aqueous solution. Then, a solution prepared by dissolving 19.0 mg (0.1 mmole) of sodium disulfite into 1.0 ml of deionized water was added to the aqueous solution. Three hours after the addition of the redox initiator, the aqueous solution was heated to 60° C. for 24 hours to allow the polymerization to proceed and a polymer in the form of gel was obtained. The obtained polymer had an inherent viscosity of 1.6 dl/g. This polymer will be referred to as polymer G-1.

Example 32

Diallyldimethylammonium chloride was polymerized in accordance with the same procedures as those conducted in Example 31 except that 40.6 mg (0.26 mmole) of 2,2,6,6-tetramethyl-1-piperidinyloxy radical, 45.6 mg (0.2 mmole) of ammonium peroxodisulfate and 38.0 mg (0.2 mmole) of sodium disulfite were used and a polymer in the form of gel was obtained. The obtained polymer had an inherent viscosity of 1.8 dl/g. This polymer will be referred to as polymer G-2.

Example 33

Diallyldimethylammonium chloride was polymerized in accordance with the same procedures as those conducted in Example 31 except that 60.9 mg (0.39 mmole) of 2,2,6,6-tetramethyl-1-piperidinyloxy radical, 68.4 mg (0.3 mmole) of ammonium peroxodisulfate and 57.0 mg (0.3 mmole) of sodium disulfite were used and a polymer in the form of gel was obtained. The obtained polymer had an inherent viscosity of 2.0 dl/g. This polymer will be referred to as polymer G-3.

Comparative Example 36

Into a 300 ml separable flask, 32.3 g (0.2 mole) of diallyldimethylammonium chloride, 27.0 mg (0.1 mmole) of 2,2-azobis(2-amidinopropane) dihydrochloride and 67.7 g of deionized water were placed and a homogeneous solution was prepared. Nitrogen gas was passed through the aqueous solution in the flask at a flow rate of 500 ml/minute for 3 hours in an ice bath and oxygen dissolved in the aqueous solution containing the monomer mixture was removed. The aqueous solution was heated to 50° C. for 24 hours to allow the thermal polymerization to proceed and a polymer in the form of gel was obtained. The obtained polymer had an inherent viscosity of 0.2 dl/g. This polymer will be referred to as polymer f-1.

Comparative Example 37

Diallyldimethylammonium chloride was polymerized in accordance with the same procedures as those conducted in Comparative Example 36 except that 54.0 mg (0.2 mmole) of 2,2-azobis(2-amidinopropane) dihydrochloride was used and a polymer in the form of gel was obtained. The obtained polymer had an inherent viscosity of 0.2 dl/g. This polymer will be referred to as polymer f-2.

Comparative Example 38

Diallyldimethylammonium chloride was polymerized in accordance with the same procedures as those conducted in Comparative Example 36 except that 81.0 mg (0.3 mmole) of 2,2-azobis(2-amidinopropane) dihydrochloride was used and a polymer in the form of gel was obtained. The obtained polymer had an inherent viscosity of 0.3 dl/g. This polymer will be referred to as polymer f-3.

The results obtained in Examples 31 to 33 and Comparative Examples 36 to 38 are shown in Table 11

TABLE 11

| | Polymer | Process of polymerization | DADMAC (mole) | TEMPO (mmole) | $K_2S_2O_8$ (mmole) | $Na_2S_2O_5$ (mmole) | ABAP (mmole) | Inherent viscosity (dl/g) |
|---|---|---|---|---|---|---|---|---|
| Example 31 | G-1 | living radical | 0.2 | 0.13 | 0.1 | 0.1 | — | 1.6 |
| Example 32 | G-2 | living radical | 0.2 | 0.26 | 0.2 | 0.2 | — | 1.8 |
| Example 33 | G-3 | living radical | 0.2 | 0.39 | 0.3 | 0.3 | — | 2.0 |
| Comparative Example 36 | f-1 | thermal | 0.2 | — | — | — | 0.1 | 0.2 |
| Comparative Example 37 | f-2 | thermal | 0.2 | — | — | — | 0.2 | 0.2 |

TABLE 11-continued

| | Polymer | Process of polymerization | DADMAC (mole) | TEMPO (mmole) | $K_2S_2O_8$ (mmole) | $Na_2S_2O_5$ (mmole) | ABAP (mmole) | Inherent viscosity (dl/g) |
|---|---|---|---|---|---|---|---|---|
| Comparative Example 38 | f-3 | thermal | 0.2 | — | — | — | 0.3 | 0.3 |

Note:
DADMAC: Diallyldimethylammonium chloride
TEMPO: 2,2,6,6-tetramethyl-1-piperidinyloxy radical
ABAP: 2,2-azobis(2-amidinopropane)dihydrochloride As shown in Table 11, in Examples 31 to 33 in which 2,2,6,6-tetramethyl-1-piperidinyloxy radical was present in an amount of 1.3 mole per 1 mole of the polymerization initiator, high molecular weight polymers having great inherent viscosities could be obtained. In contrast, in Comparative Examples 36 to 38 in which the water-soluble azo compound was used as the initiator and 2,2,6,6-tetramethyl-1-piperidinyloxy radical was not added, low molecular weight polymers having small inherent viscosities were obtained.

Example 34

Using polymer G-2 obtained in Example 32, flocculation of waste water from cleaning was conducted. The properties of the waste water were as follows: pH: 6.8; the electric conductivity: 97.2 mS/m; and SS: 3,120 mg/liter.

Into a 500 ml glass beaker, 500 ml of the waste water was placed. While the waste water was stirred at a speed of 150 rpm, polymer G-2 was added in an amount of 100 mg/liter and the reaction was allowed to proceed for 1 minute. Then, the stirring was stopped and 8 mg/liter of an anionic macromolecular flocculant [manufactured by KURITA WATER INDUSTRIES, Ltd.; KURIFLOCK PA331] was added. The mixture was stirred at a speed of 150 rpm for 1 minute and at a speed of 50 rpm for 1 minute. The diameter of flocks formed by the flocculation was 8 mm or larger. The speed of sedimentation of flocks formed by the flocculation was 24 m/hour when the stirring was stopped. The turbidity of the supernatant liquid was 12 degrees.

Example 35

The same procedures as those conducted in Example 34 were conducted except that polymer G-2 was added in an amount of 150 mg/liter. The diameter of flocks formed by the flocculation was 8 mm or larger. The speed of sedimentation of flocks formed by the flocculation was 24 m/hour when the stirring was stopped. The turbidity of the supernatant liquid was 10 degrees.

Example 36

The same procedures as those conducted in Example 34 were conducted except that polymer G-2 was added in an amount of 200 mg/liter. The diameter of flocks formed by the flocculation was 8 mm or larger. The speed of sedimentation of flocks formed by the flocculation was 24 m/hour when the stirring was stopped. The turbidity of the supernatant liquid was 8 degrees.

Comparative Example 39

The same procedures as those conducted in Example 34 were conducted except that polymer f-2 obtained in Comparative Example 37 in an amount of 100 mg/liter was added in place of polymer G-2. The diameter of flocks formed by the flocculation was 2 mm. The speed of sedimentation of flocks formed by the flocculation was 3 m/hour when the stirring was stopped. The turbidity of the supernatant liquid was 87 degrees.

Comparative Example 40

The same procedures as those conducted in Example 34 were conducted except that polymer f-2 in an amount of 150 mg/liter was added in place of polymer G-2. The diameter of flocks formed by the flocculation was 3 mm. The speed of sedimentation of flocks formed by the flocculation was 3 m/hour when the stirring was stopped. The turbidity of the supernatant liquid was 78 degrees.

Comparative Example 41

The same procedures as those conducted in Example 34 were conducted except that polymer f-2 in an amount of 200 mg/liter was added in place of polymer G-2. The diameter of flocks formed by the flocculation was 3 mm. The speed of sedimentation of flocks formed by the flocculation was 5 m/hour when the stirring was stopped. The turbidity of the supernatant liquid was 75 degrees.

Comparative Example 42

The same procedures as those conducted in Example 34 were conducted except that sulfate alum, which was used as the inorganic flocculant in place of polymer G-2, was added in an amount of 300 mg/liter. The diameter of flocks formed by the flocculation was 5 mm. The speed of sedimentation of flocks formed by the flocculation was 8 m/hour when the stirring was stopped. The turbidity of the supernatant liquid was 51 degrees.

Comparative Example 43

The same procedures as those conducted in Example 34 were conducted except that sulfate alum in an amount of 400 mg/liter was added in place of polymer G-2. The diameter of flocks formed by the flocculation was 7 mm. The speed of sedimentation of flocks formed by the flocculation was 12 m/hour when the stirring was stopped. The turbidity of the supernatant liquid was 38 degrees.

Comparative Example 44

The same procedures as those conducted in Example 34 were conducted except that sulfate alum in an amount of 500 mg/liter was added in place of polymer G-2. The diameter of flocks formed by the flocculation was 8 mm or larger. The speed of sedimentation of flocks formed by the flocculation was 16 m/hour when the stirring was stopped. The turbidity of the supernatant liquid was 24 degrees.

The results obtained in Examples 34 to 36 and Comparative Examples 39 to 44 are shown in Table 12.

TABLE 12

| | Polymer | | Sulfate | Macro-molecular | Diameter | Speed of sedi- | Turbidity of supernatant |
|---|---|---|---|---|---|---|---|
| | type | amount (mg/liter) | alum (mg/liter) | flocculant (mg/liter) | of flocks (mm) | mentation (m/hr) | liquid (degree) |
| Example 34 | G-2 | 100 | — | 8 | >8 | 24 | 12 |
| Example 35 | G-2 | 150 | — | 8 | >8 | 24 | 10 |
| Example 36 | G-2 | 200 | — | 8 | >8 | 24 | 8 |
| Comparative Example 39 | f-2 | 100 | — | 8 | 2 | 3 | 87 |
| Comparative Example 40 | f-2 | 150 | — | 8 | 3 | 3 | 78 |
| Comparative Example 41 | f-2 | 200 | — | 8 | 3 | 5 | 75 |
| Comparative Example 42 | — | — | 300 | 8 | 5 | 8 | 51 |
| Comparative Example 43 | — | — | 400 | 8 | 7 | 12 | 38 |
| Comparative Example 44 | — | — | 500 | 8 | >8 | 16 | 24 |

As shown in Table 12, in Examples 34 to 36 in which polymer G-2 obtained in accordance with the process of the present invention and the anionic macromolecular flocculant were used in combination, flocks in an excellent condition were formed by the flocculation, the speed of sedimentation was great and the turbidity of the supernatant liquid exhibited the values smaller than 12 degrees. In contrast, in Comparative Examples 39 to 41 in which polymer f-2 obtained in accordance with a conventional process and the anionic macromolecular flocculant were used in combination and in Comparative Examples 42 to 44 in which sulfate alum and the anionic macromolecular flocculant were used in combination, in general, the diameter of flocks was small, the speed of sedimentation was small and the turbidity of supernatant liquid was great.

Example 37

Using polymer G-3 obtained in Example 33, flocculation of waste water from an automobile manufacturing plant was conducted. The properties of the waste water were as follows: pH: 7.2; the electric conductivity: 32 mS/m; and SS 3,500 mg/liter.

Into a 500 ml glass beaker, 500 ml of waster water was placed. While the waste water was stirred at a speed of 150 rpm, 30 mg/liter of sulfate alum as the inorganic flocculant was added and the mixture was stirred for 1 minute. Then, 4 mg/liter of polymer G-3 was added and the reaction was allowed to proceed for 1 minute. The stirring was stopped and 3 mg/liter of an anionic macromolecular flocculant [manufactured by KURITA WATER INDUSTRIES, Ltd.; KURIFLOCK PA331] was added. The obtained mixture was stirred at a speed of 150 rpm for 1 minute and at a speed of 50 rpm for 1 minute. The diameter of flocks formed by the flocculation was 5 mm. The speed of sedimentation of flocks formed by the flocculation was 12 m/hour when the stirring was stopped. The turbidity of the supernatant liquid was 10 degrees.

Example 38

The same procedures as those conducted in Example 37 were conducted except that polymer G-3 was added in an amount of 5 mg/liter. The diameter of flocks formed by the flocculation was 6 mm. The speed of sedimentation of flocks formed by the flocculation was 12 m/hour when the stirring was stopped. The turbidity of the supernatant liquid was 8 degrees.

Example 39

The same procedures as those conducted in Example 37 were conducted except that polymer G-3 was added in an amount of 6 mg/liter. The diameter of flocks formed by the flocculation was 6 mm. The speed of sedimentation of flocks formed by the flocculation was 15 m/hour when the stirring was stopped. The turbidity of the supernatant liquid was 8 degrees.

Comparative Example 45

The same procedures as those conducted in Example 37 were conducted except that polymer f-3 obtained in Comparative Example 38 in an amount of 4 mg/liter was added in place of polymer G-3. The diameter of flocks formed by the flocculation was 2 mm. The speed of sedimentation of flocks formed by the flocculation was 3 m/hour when the stirring was stopped. The turbidity of the supernatant liquid was 42 degrees.

Comparative Example 46

The same procedures as those conducted in Example 37 were conducted except that polymer f-3 in an amount of 5 mg/liter was added in place of polymer G-3. The diameter of flocks formed by the flocculation was 3 mm. The speed of sedimentation of flocks formed by the flocculation was 5 m/hour when the stirring was stopped. The turbidity of the supernatant liquid was 40 degrees.

Comparative Example 47

The same procedures as those conducted in Example 37 were conducted except that polymer f-3 in an amount of 6 mg/liter was added in place of polymer G-3. The diameter of flocks formed by the flocculation was 3 mm. The speed of sedimentation of flocks formed by the flocculation was 5 m/hour when the stirring was stopped. The turbidity of the supernatant liquid was 38 degrees.

Comparative Example 48

Using sulfate alum as the inorganic flocculant alone without adding polymer G-3, flocculation of waste water from an automobile manufacturing plant which was the same as waste water treated in Example 37 was conducted.

Into a 500 ml glass beaker, 500 ml of waster water was placed. While the waste water was stirred at a speed of 150 rpm, 60 mg/liter of sulfate alum as the inorganic flocculant was added and the mixture was stirred for 1 minute. The stirring was stopped and 3 mg/liter of an anionic macromolecular flocculant [manufactured by KURITA WATER INDUSTRIES, Ltd.; KURIFLOCK PA331] was added. The obtained mixture was stirred at a speed of 150 rpm for 1 minute and at a speed of 50 rpm for 1 minute. The diameter of flocks formed by the flocculation was 2 mm. The speed of sedimentation of flocks formed by the flocculation was 3 m/hour when the stirring was stopped. The turbidity of the supernatant liquid was 48 degrees.

Comparative Example 49

The same procedures as those conducted in Comparative Example 48 were conducted except that sulfate alum was added in an amount of 90 mg/liter. The diameter of flocks formed by the flocculation was 3 mm. The speed of sedimentation of flocks formed by the flocculation was 5 m/hour when the stirring was stopped. The turbidity of the supernatant liquid was 42 degrees.

Comparative Example 50

The same procedures as those conducted in Comparative Example 48 were conducted except that sulfate alum was added in an amount of 120 mg/liter. The diameter of flocks formed by the flocculation was 3 mm. The speed of sedimentation of flocks formed by the flocculation was 5 m/hour when the stirring was stopped. The turbidity of the supernatant liquid was 34 degrees.

The results obtained in Examples 37 to 39 and Comparative Examples 45 to 50 are shown in Table 13.

increased without adding the anionic macromolecular flocculant, the diameter of flocks was small, the speed of sedimentation was small and the turbidity of supernatant liquid was great.

Example 40

Into a 300 ml separable flask, 46.5 g (0.24 mole) of a quaternary compound of methyl chloride with dimethylaminoethyl acrylate, 4.3 g (0.06 mole) of acrylamide and 46.2 g of deionized water were placed and a homogeneous solution was prepared. While the prepared aqueous solution was stirred, a solution prepared by dissolving 7.2 mg (0.05 mmole) of di-t-butylamineoxy radical into 1.0 ml of methanol was added and di-t-butylamineoxy radical was dispersed into the aqueous solution. Nitrogen gas was passed through the aqueous solution in the flask at a flow rate of 500 ml/minute for 3 hours in an ice bath and oxygen dissolved in the aqueous solution containing the monomer mixture was removed. While this aqueous solution was cooled in an ice bath and stirred, a solution prepared by dissolving 11.4 mg (0.05 mmole) of ammonium peroxodisulfate in 1.0 ml of deionized water was added and then a solution prepared by dissolving 9.5 mg (0.05 mmole) of sodium disulfite in 1.0 ml of deionized water was added to the aqueous solution. The obtained solution was stirred for 3 hours. Then, the aqueous solution was heated at 30° C. and the polymerization was allowed to proceed for 15 hours. Polymer obtained in the form of gel was taken out, dried by heating and pulverized and a powder polymer was obtained. The polymer had an inherent viscosity of 6.8 dl/g. The obtained polymer will be referred to as polymer H.

Comparative Example 51

Into a 300 ml separable flask, 46.5 g (0.24 mole) of a quaternary compound of methyl chloride with dimethylami-

TABLE 13

|  | Polymer | | Sulfate alum (mg/liter) | Macro-molecular flocculant (mg/liter) | Diameter of flocks (mm) | Speed of sedi-mentation (m/hr) | Turbidity of supernatant liquid (degree) |
| --- | --- | --- | --- | --- | --- | --- | --- |
|  | type | amount (mg/liter) | | | | | |
| Example 37 | G-3 | 4 | 30 | 3 | 5 | 12 | 10 |
| Example 38 | G-3 | 5 | 30 | 3 | 6 | 12 | 8 |
| Example 39 | G-3 | 6 | 30 | 3 | 6 | 15 | 8 |
| Comparative Example 45 | f-3 | 4 | 30 | 3 | 2 | 3 | 42 |
| Comparative Example 46 | f-3 | 5 | 30 | 3 | 3 | 5 | 40 |
| Comparative Example 47 | f-3 | 6 | 30 | 3 | 3 | 5 | 38 |
| Comparative Example 48 | — | — | 60 | 3 | 2 | 3 | 48 |
| Comparative Example 49 | — | — | 90 | 3 | 3 | 5 | 42 |
| Comparative Example 50 | — | — | 120 | 3 | 3 | 5 | 34 |

As shown in Table 13, in Examples 37 to 39 in which sulfate alum, polymer G-3 obtained in accordance with the process of the present invention and the anionic macromolecular flocculant were used in combination, flocks in an excellent condition were formed by the flocculation, the speed of sedimentation was great and the turbidity of the supernatant liquid exhibited the values smaller than 10 degrees.

In contrast, in Comparative Examples 45 to 47 in which sulfate alum, polymer f-3 obtained in accordance with a conventional process and the anionic macromolecular flocculant were used in combination and in Comparative Examples 48 to 50 in which the amount of sulfate alum was noethyl acrylate, 4.3 g (0.06 mole) of acrylamide, 13.6 mg (0.05 mmole) of 2,2-azobis(2-amidinopropane) dihydrochloride and 49.2 g of deionized water were placed and a homogeneous solution was prepared. Nitrogen gas was passed through the aqueous solution in the flask at a flow rate of 500 ml/minute for 3 hours in an ice bath and oxygen dissolved in the aqueous solution containing the monomer mixture was removed. Then, the aqueous solution was heated at 40° C. and the thermal polymerization was allowed to proceed for 15 hours. Polymer obtained in the form of gel was taken out, dried by heating and pulverized and a powder polymer was obtained. The polymer had an inherent viscosity of 7.0 dl/g. The obtained polymer will be referred to as polymer g.

The processes of the polymerization, the compositions and the inherent viscosities of the polymers obtained in Example 40 and Comparative Example 51 are shown in Table 14.

TABLE 14

| | Polymer | Process of polymerization | Composition of polymer DAA/AAm (% by mole) | Inherent viscosity (dl/g) |
|---|---|---|---|---|
| Example 40 | H | living radical | 80/20 | 6.8 |
| Comparative Example 51 | g | thermal | 80/20 | 7.0 |

Note:
DAA: A quaternary compound of methyl chloride with dimethylaminoethyl acrylate
AAm: Acrylamide

Example 41

Using polymer H obtained in Example 40, mixed sludge from a sewage treatment center was subjected to a desk top test using a belt press dewatering machine. The properties of the sludge were as follows: pH: 5.47; the electric conductivity: 120 mS/m; SS: 2.47% by weight; VSS/SS: 87.8% by weight; and the content of fiber/SS: 12.0% by weight.

Into a 500 ml beaker, 200 ml of the sludge was placed and a 0.2% by weight aqueous solution of polymer H was added in an amount such that the concentration of polymer H was 40 mg/liter and the obtained mixture was mixed by a spatula at a speed of 180 rpm for 30 seconds. The diameter of flocks of the flocculated sludge was 2 mm. In a Büchner funnel in which nylon cloth was laid, a cylinder of a rigid vinyl chloride resin having an inner diameter of 50 mm was placed. The flocculated sludge was poured into the cylinder as quickly as possible. The amount of the filtrate was 52 ml after the gravity filtration for 20 seconds. The sludge accumulated on the nylon cloth after the filtration was transferred to a filter cloth for a belt press and squeezed under a pressure of 98 kPa for 1 minute and a dewatered cake was obtained. The obtained dewatered cake was dried at 120° C. for 3 hours and the content of water in the cake was measured. The content of water in the dewatered cake was 81.1% by weight.

The concentration of polymer H was adjusted to 60 mg/liter, 80 mg/liter, 100 mg/liter and 120 mg/liter and the test of flocculation and filtration and the test of squeezing were conducted in accordance with the same procedures as those described above. The diameter of flocks, the amount of the filtrate after 20 seconds and the content of water in the cake were measured.

Comparative Example 52

Using polymer g obtained in Comparative Example 51 in place of polymer H obtained in Example 40, the test of flocculation and filtration and the test of squeezing were conducted in accordance with the same procedures as those conducted in Example 41 and the diameter of flocks, the amount of the filtrate after 20 seconds and the content of water in the cake were measured.

The results obtained in Example 41 and Comparative Example 52 are shown in Table 15.

TABLE 15

| Polymer | | | Diameter of flocks (mm) | Amount of filtrate after 20 seconds (ml) | Content of water in cake (% by wt.) |
|---|---|---|---|---|---|
| | type | amount (mg/liter) | | | |
| Example 41 | H | 40 | 2 | 52 | 81.1 |
| | H | 60 | 3 | 80 | 80.3 |
| | H | 80 | 3 | 80 | 80.0 |
| | H | 100 | 2 | 66 | 80.1 |
| | H | 120 | 2 | 58 | 80.3 |
| Comparative Example 52 | g | 40 | 1 | 32 | 81.8 |
| | g | 60 | 2 | 58 | 81.1 |
| | g | 80 | 2 | 52 | 81.2 |
| | g | 100 | 1 | 38 | 81.3 |
| | g | 120 | 1 | 32 | 80.7 |

As shown in Table 15, in Example 41 in which polymer H obtained in accordance with the process of the present invention was used, flocks formed by the flocculation had large diameters and provided great speeds of filtration in the gravity filtration, exhibiting the excellent property of filtration. The contents of water in the dewatered cake obtained by the squeezing were small.

In contrast, in Comparative Example 52 in which polymer g, i.e., a conventional macromolecular flocculant, was used, flocks formed by the flocculation had small diameters and provided small speeds of filtration in the gravity filtration, exhibiting the poor property of filtration. The contents of water in the dewatered cake obtained by the squeezing were great.

Example 42

Into a 300 ml separable flask, 1.0 g (0.005 mole) of a quaternary compound of methyl chloride with dimethylaminoethyl methacrylate, 28.1 g (0.145 mole) of a quaternary compound of methyl chloride with dimethylaminoethyl acrylate, 12.4 g (0.175 mole) of acrylamide, 12.6 g (0.175 mole) of acrylic acid and 42.9 g of deionized water were placed and a homogeneous solution was prepared. While the prepared aqueous solution was stirred, a solution prepared by dissolving 4.7 mg (0.03 mmole) of 2,2,6,6-tetramethyl-1-piperidinyloxy radical into 1.0 ml of methanol was added and 2,2,6,6-tetramethyl-1-piperidinyloxy radical was dispersed into the aqueous solution. Nitrogen gas was passed through the aqueous solution in the flask at a flow rate of 500 ml/minute for 3 hours in an ice bath and oxygen dissolved in the aqueous solution containing the monomer mixture was removed. While this aqueous solution was cooled in an ice bath and stirred, a solution prepared by dissolving 6.8 mg (0.03 mmole) of ammonium peroxodisulfate in 1.0 ml of deionized water was added and then a solution prepared by dissolving 5.7 mg (0.03 mmole) of sodium disulfite in 1.0 ml of deionized water was added to the aqueous solution. The obtained solution was stirred for 3 hours. Then, the aqueous solution was heated at 30° C. and the polymerization was allowed to proceed for 15 hours. Polymer obtained in the form of gel was taken out, dried by heating and pulverized and a powder polymer was obtained. The polymer had an inherent viscosity of 7.7 dl/g. The obtained polymer will be referred to as polymer I.

Comparative Example 53

Into a 300 ml separable flask, 1.0 g (0.005 mole) of a quaternary compound of methyl chloride with dimethylaminoethyl methacrylate, 28.1 g (0.145 mole) of a quaternary compound of methyl chloride with dimethylaminoethyl acrylate, 12.4 g (0.175 mole) of acrylamide, 12.6 g (0.175 mole) of acrylic acid, 8.1 mg (0.03 mmole) of 2,2-azobis (2-amidinopropane) dihydrochloride and 45.9 g of deionized water were placed and a homogeneous solution was prepared. Nitrogen gas was passed through the aqueous solution in the flask at a flow rate of 500 ml/minute for 3 hours in an ice bath and oxygen dissolved in the aqueous solution containing the monomer mixture was removed. Then, the aqueous solution was heated at 40° C. and the thermal polymerization was allowed to proceed for 15 hours. Polymer obtained in the form of gel was taken out, dried by heating and pulverized and a powder polymer was obtained. The polymer had an inherent viscosity of 8.4 dl/g. The obtained polymer will be referred to as polymer h.

The processes of the polymerization, the compositions and the inherent viscosities of the polymers obtained in Example 42 and Comparative Example 53 are shown in Table 16.

TABLE 16

| | Polymer | Process of polymerization | Composition of polymer DAM/ DAA/AAm/AA (% by mole) | Inherent viscosity (dl/g) |
|---|---|---|---|---|
| Example 42 | I | living radical | 1/29/35/35 | 7.7 |
| Comparative Example 53 | h | thermal | 1/29/35/35 | 8.4 |

Note:
DAM: A quaternary compound of methyl chloride with dimethylaminoethyl methacrylate
DAA: A quaternary compound of methyl chloride with dimethylaminoethyl acrylate
AAm: Acrylamide
AA: Acrylic acid

Example 43

Using polymer I obtained in Example 42, digested sludge from a sewage treatment center was subjected to a desk top test using a belt press dewatering machine. The properties of the sludge were as follows: pH: 6.43; the electric conductivity: 15 mS/m; SS: 1.93% by weight; VSS/SS: 62.8% by weight; and the content of fiber/SS: 5.2% by weight.

Into a 500 ml stainless steel vessel, 200 ml of the sludge was placed and stirred at a speed of 5,000 rpm using a homogenizer (manufactured by NIHONSEIKI KAISHA, Ltd.; EXCEL AUTO HOMOGENIZER). When the speed of rotation was stabilized, a 20% by weight aqueous solution of iron polysulfate was added to the sludge in an amount such that the concentration of iron polysulfate was 2,500 mg/liter. To the obtained mixture, a 0.2% by weight aqueous solution of polymer I was added in an amount such that the concentration of polymer I was 60 mg/liter and the obtained mixture was stirred for 5 seconds. The diameter of flocks of the flocculated sludge was 3.5 mm. In a Büchner funnel in which nylon cloth was laid, a cylinder of a rigid vinyl chloride resin having an inner diameter of 50 mm was placed. The flocculated sludge was poured into the cylinder as quickly as possible. The amount of the filtrate was 98 ml after the gravity filtration for 20 seconds. The sludge accumulated on the nylon cloth after the filtration was transferred to a filter cloth for a belt press and squeezed under a pressure of 49 kPa for 1 minute and a dewatered cake was obtained. The dewatered cake was dried at 120° C. for 3 hours and the content of water in the dried cake was measured. The content of water in the dewatered cake was 81.8% by weight.

The concentration of polymer I was adjusted to 80 mg/liter and 100 mg/liter and the test of flocculation and filtration and the test of squeezing were conducted in accordance with the same procedures as those described above. The diameter of flocks, the amount of the filtrate after 20 seconds and the content of water in the cake were measured.

Comparative Example 54

Using polymer h obtained in Comparative Example 53 in an amount such that the concentration of polymer h was 60 mg/liter, 80 mg/liter, 100 mg/liter or 120 mg/liter in place of polymer I obtained in Example 42, the test of flocculation and filtration and the test of squeezing were conducted in accordance with the same procedures as those conducted in Example 43 and the diameter of flocks, the amount of the filtrate after 20 seconds and the content of water in the cake were measured.

The results obtained in Example 43 and Comparative Example 54 are shown in Table 17.

TABLE 17

| | Iron poly- sulfide (mg/ liter) | Polymer type | Polymer amount (mg/ liter) | Diameter of flocks (mm) | Amount of fil- trate after 20 seconds (ml) | Content of water in cake (% by wt.) |
|---|---|---|---|---|---|---|
| Example 43 | 2500 | I | 60 | 3.5 | 98 | 81.8 |
| | 2500 | I | 80 | 4 | 132 | 81.3 |
| | 2500 | I | 100 | 4 | 112 | 81.5 |
| Com- parative Example 54 | 2500 | h | 60 | 1 | 32 | 83.8 |
| | 2500 | h | 80 | 2 | 52 | 83.2 |
| | 2500 | h | 100 | 2.5 | 78 | 82.6 |
| | 2500 | h | 120 | 2 | 62 | 83.1 |

As shown in Table 17, in Example 43 in which polymer I obtained in accordance with the process of the present invention was used, flocks formed by the flocculation had large diameters and provided great speeds of filtration in the gravity filtration, exhibiting the excellent property of filtration. The contents of water in the dewatered cake obtained by the squeezing were small.

In contrast, in Comparative Example 54 in which polymer h, i.e., a conventional macromolecular flocculant, was used, flocks formed by the flocculation had small diameters and provided small speeds of filtration in the gravity filtration, exhibiting the poor property of filtration. The contents of water in the dewatered cake obtained by the squeezing were great.

What is claimed is:

1. A process for producing a polymer of a diallyldialkylammonium halide which comprises polymerizing said diallyldialkylammonium halide in the presence of a polymerization initiator in an aqueous solution containing a nitroxy radical.

2. The process according to claim 1, wherein the nitroxy radical is selected from the group consisting of di-t-butylamineoxy radical, 2,2,6,6-tetramethyl-1-piperidinyloxy radical and 4-hydroxy-2,2,6,6-tetramethyl-1-piperidinyloxy radical.

3. The process according to claim 1, wherein the polymerization initiator is a salt of peroxodisulfuric acid, the nitroxy radical is present in an amount of 0.01 to 2 moles per 1 mole of the polymerization initiator and the polymerizing is carried out at a temperature of 10 to 60° C.

4. The process for producing a polymer according to claim 1, wherein said diallyldialkylammonium halide is a diallyldialkylammonium chloride.

5. The process according to claim 1, wherein the initiator is selected from the group consisting of a salt of peroxodisulfuric acid, an azo initiator, a redox initiator and a photopolymerization initiator.

6. The process according to claim 1, wherein the initiator is a salt of peroxodisulfuric acid.

7. The process according to claim 6, wherein the salt of peroxodisulfuric acid is selected from the group consisting of ammonium peroxodisulfate, sodium peroxodisulfate, potassium peroxodisulfate and barium peroxodisulfate.

8. The process according to claim 1, wherein the initiator is an azo initiator selected from the group consisting of azobisisobutyronitrile, 2,2, -azobis(2-amidinopropane) dihydrochloride, 2,2-azobis(2,4-dimethylvaleronitrile), 4,4-azobis(4-cyanopentanoic acid), 2,2-azobis[2-($\beta$-methyl-2-imidazolin-2-yl)propane] dihydrochloride, 2,2-azobis[2-(2-imidazolin-2-yl)propane] dihydrochloride and 2,2-azobis[2-(2-imidazolin-2-yl)propane].

9. The process according to claim 1, wherein the initiator is a redox initiator selected from the group consisting of hydrogen peroxide, ammonium peroxodisulfate, sodium peroxodisulfate, potassium peroxodisulfate, barium peroxodisulfate, potassium permanganate, cumene hydroperoxide and benzoyl peroxide, with a reducing agent.

10. The process according to claim 9, wherein the reducing agent is selected from the group consisting of sodium hydrogensulfite, sodium disulfite, iron (II) sulfate, a copper (I) salt, hydroxylamine, hydrazine and dimethylaniline.

11. The process according to claim 1, wherein the initiator is a photopolymerization initiator selected from the group consisting of benzoin, benzoin methyl ether and benzoin propyl ether.

* * * * *